United States Patent
Oohira et al.

(10) Patent No.: US 6,569,816 B2
(45) Date of Patent: May 27, 2003

(54) COMPOSITION HAVING LUBRICITY AND PRODUCT COMPRISING THE COMPOSITION

(75) Inventors: Kouya Oohira, Kuwana (JP); Masaki Egami, Kuwana (JP); Eiichirou Shimazu, Kuwana (JP); Hideyuki Tsutsui, Kuwana (JP)

(73) Assignee: NTN Corporation, Osaka (JP)

( * ) Notice: Subject to any disclaimer, the term of this patent is extended or adjusted under 35 U.S.C. 154(b) by 61 days.

(21) Appl. No.: 09/928,631

(22) Filed: Aug. 13, 2001

(65) Prior Publication Data

US 2003/0022797 A1 Jan. 30, 2003

(30) Foreign Application Priority Data

| | | |
|---|---|---|
| Aug. 18, 2000 | (JP) | 2000-248154 |
| Sep. 22, 2000 | (JP) | 2000-289174 |
| Sep. 22, 2000 | (JP) | 2000-289175 |
| Jun. 11, 2001 | (JP) | 2001-175659 |

(51) Int. Cl.$^7$ .................. C10M 125/26; F16C 33/00
(52) U.S. Cl. ................ 508/107; 508/100; 508/136
(58) Field of Search .................. 508/100, 107, 508/136

(56) References Cited

U.S. PATENT DOCUMENTS

| | | | | |
|---|---|---|---|---|
| 3,647,500 A | * | 3/1972 | Mizuno | 508/107 |
| 4,104,176 A | * | 8/1978 | Bidler | 508/100 |
| 5,955,402 A | * | 9/1999 | Hirata et al. | 508/106 |
| 6,228,813 B1 | * | 5/2001 | Yabe et al. | 508/106 |

FOREIGN PATENT DOCUMENTS

| | | |
|---|---|---|
| JP | 61-006429 | 1/1986 |
| JP | 01-093623 | 4/1989 |
| JP | 08-021450 | 1/1996 |
| JP | 2000-097241 | 4/2000 |

* cited by examiner

Primary Examiner—Jacqueline V. Howard
(74) Attorney, Agent, or Firm—Hedman & Costigan, P.C.

(57) ABSTRACT

A composition having lubricity such as a low degree of friction and wear and capable of supplying a lubricant continuously to a surface of a slide surface is disclosed. Also, a slide bearing, a retainer for a rolling bearing, and a seismically isolated apparatus formed by molding the composition are disclosed. The composition is composed by adding a porous silica and a lubricant to a base material; adding the lubricant-impregnated porous silica to the base material; or adding the lubricant-impregnated porous silica and the lubricant to the base material.

20 Claims, 14 Drawing Sheets

US 6,569,816 B2

COMPOSITION HAVING LUBRICITY AND PRODUCT COMPRISING THE COMPOSITION

BACKGROUND OF THE INVENTION

The present invention relates to a composition having lubricity and a product comprising the composition (hereinafter referred to as slide product). Particularly, the present invention relates to a composition having lubricity such as a lubricating resinous composition, lubricating elastomer composition, and a lubricating coating film composition capable of continuously oozing a lubricant to a slide interface little by little; an additive imparting lubricity to a base material; and a slide product using these compositions. Representative slide products are a slide bearing, a retainer for a holding a roll of a rolling bearing, and a seismically isolated apparatus.

Among demands growing year by year for the composition having lubricity such as a resinous slide member obtained by molding the lubricating resinous composition, a material having rubber elasticity, and a lubricating coating film, the strong demands are that they have low degree of friction and wear in an initial time and they maintain their initial sliding property for a long time. For low degree of friction and wear, a solid lubricant such as graphite, polytetrafluoroethylene (hereinafter referred to as PTFE), molybdenum disulfide ($MoS_2$), boron nitride (BN) or the like is added to resin or a reinforcing material such as glass fiber and carbon fiber is added thereto to impart slide characteristic to the composition having lubricity. However, only the addition of the solid lubricant has a limitation in lowering the friction characteristic. Under these circumstances, a method of adding lubricating oil or the like has been carried out.

As the additive imparting lubricity to a base material, solid lubricants such as graphite, PTFE, molybdenum disulfide, boron nitride and the like are known. Base materials improve lubricity by adding the solid lubricants to the base materials such as resin, rubber, and the coating film. However, only the addition of the solid lubricant has a limitation in lowering a coefficient of friction and is incapable of allowing materials to have lower degree of friction. For achieving lower degree of friction, boundary lubrication by means of oil is generally adopted. For example, if a state in which the lubricating oil is always present on a slide interface can be maintained by adding the lubricating oil to a material, the material is allowed to have a lower degree of friction.

But the addition of only the lubricant to the resinous material or the like causes the following problems: In the case where only the lubricating oil is dispersed in the resinous material as the lubricant, the dispersion unit of the oil changes owing to kneading. Thus it is difficult to reliably manufacture a material having uniform slide characteristic.

To improve the slide characteristic of the resinous material such as the friction characteristic thereof, it is preferable that the addition amount of the lubricating oil is large. However, if the addition amount of the lubricating oil is large, a screw slip in a kneading time and metering time period is not uniform, which causes a cycle time to be long. Thus stable manufacturing is difficult. In addition, oil attaches to a die and a size accuracy is unstable. Further, if the lubricating oil and the base material are not compatible with each other, the lubricating oil cannot be dispersed into the base material, depending on the combination thereof.

In the lubricating oil-containing resinous material, a resinous layer of the base is worn little by little at a slide time and a lubricating oil layer appears on the slide portion. That is, the lubricating oil oozes on the surface of the slide portion. It is difficult to control the oozing condition of the lubricating oil. Thus there is a possibility that a pore from which the lubricating oil has oozed causes reduction of strength of the resinous layer.

In the case where a filler is added to the base material to improve the mechanical strength and wear resistance of the composition having lubricity, oil is locally present on the interface of the filler. Thus a sufficient reinforcing effect cannot be obtained.

The slide product obtained by molding the composition includes a slide bearing, a retainer for a rolling bearing, a seismically isolated apparatus, and the like.

The conventional retainer for a rolling bearing is made from metal, polyamide resin, polyacetal resin, polybutylene terephthalate resin, and the like. In molding synthetic resin, injection-moldable synthetic resin or a synthetic resinous composition reinforced with glass fiber, carbon fiber or organic fiber added to a molding material of the synthetic resin has been used. Semi-solid lubricant such as lubricating oil or grease has been used to lubricate the retainer-incorporated rolling bearing.

In the case where the semi-solid lubricant such as grease is used, resistance to stirring is generated by the consistency of the lubricant. Therefore, when a rotary shaft supported by the bearing rotates, a required torque is applied and a torque fluctuation is generated. In the conventional bearing incorporating the retainer owing to grease lubrication, when the rotational speed of the inner ring or the outer ring is as high as about 10,000 rpm, the resistance to stirring generated by the consistency of the grease causes a required torque for rotating the rotary shaft supported by the bearing to be high and a torque fluctuation to occur. Further, owing to the presence of the grease, a comparatively large amount of dust floats in the periphery of the bearing. Owing to such an increase and fluctuation of torque, generation of dust, and generation of noise caused by the rotation of the bearing, there is reduction of the performance of a bearing, especially a bearing having a diameter not more than 6 mm, which is incorporated in office appliances such as an HDD, a VTR, a DAT, a LBP and audio appliances, peripheral appliances, and the like.

To improve these problems, there are proposed a retainer, for a rolling bearing, composed of a material having a lubricating function. In Japanese Patent Application Laid-Open No.61-6429, there is disclosed the bearing containing polyamide-imide resin porously compression-molded and impregnated with fluorinated oil. According to Japanese Patent Application Laid-Open No.1-93623, the retainer formed by molding oil-containing plastic consisting of the oil-containing binder and the matrix is impregnated with lubricating oil. According to Japanese Patent Application Laid-Open No.8-21450, the mixture of polyolefin resin and the lubricating oil is molded into the configuration of the retainer. According to Japanese Patent Application Laid-Open No.2000-97241, the mixture of synthetic resin and the inorganic porous particulate matter is molded into the configuration of the retainer.

However, the retainer disclosed in Japanese Patent Application Laid-Open No.61-6429 is inferior to a retainer composed of a precise porous material in its mechanical strength. Thus depending on a use condition, the retainer lacks strength. Further because interconnected pores are formed, powdery resin is compression-molded, sintered, and then machined. Thus a large number of manufacturing processes are required.

In the case of the retainer disclosed in Japanese Patent Application Laid-Open No.1-93623, to increase oil absorption capacity, it is necessary to immerse the retainer in the lubricating oil at a high temperature (120° C.–130° C.) for a long time (about seven days). Therefore, there is a possibility that the lubricating oil and the resin forming the retainer deteriorate and dimensions change greatly. That is, the method is inferior in the stability of products. Another disadvantage is that the lubricating oil oozes at a comparatively early time. Thus the retainer is incapable of maintaining stable lubricity for a long time.

In the case of the retainer disclosed in Japanese Patent Application Laid-Open No.8-21450, the lubricating oil is held by polyolefin resin because the polyolefin resin is highly absorbent of oil. Thus little oil oozes from the retainer. Even though the lubricating oil is uniformly dispersed in the polyolefin resin, the lubricating oil in the vicinity of the surface of the retainer oozes. However, it is technically difficult to ooze the lubricating oil from the inside of the retainer at a stable speed for a long time.

Another problem is that if much lubricating oil is added to the polyolefin resin, problems occur in the production of the retainer. For example, it is likely that a screw slip in a kneading time, metering is unstable, which causes a cycle time to be long, a size accuracy is unstable, and the lubricating oil attaches to the surface of a die, which causes the finish of a molded product to be poor.

In the case of the retainer disclosed in Japanese Patent Application Laid-Open No.2000-97241, the lubricating oil is not held inside the resin and when oil supply is stopped, the lubricating oil is supplied to a slide interface owing to capillary action. Thus the lubricating oil does not ooze at a uniform speed from the inside for a long time.

A seismically isolated apparatus supports a multistory structure such as buildings and towers; a low structure such as single-family houses; a public structure such as bridges over roads and for railways, and the like and reduces the degree of a seism-caused force applied thereto. That is, escape from a seism means reduction of the degree of a seism-caused force applied to buildings or the like by using a method. Widely used is a seismically isolated apparatus or a seismically isolating method of base insulation type of reducing the degree of a seism-caused force applied to a building by inserting an apparatus between the base or footing and the building.

For example, a seismically isolated apparatus constructed of a combination of a slide support and a horizontal spring is hitherto used.

The seismically isolated apparatus is so constructed as to slide two plates on each other. One of the two plates is installed on a slide material such as a resinous slide plate bonded to a footing of the slide support. The other metal plate is installed on a pillar. That is, by sliding the building according to a seism-caused horizontal shaking of the ground, a force greater than a frictional force acting on a slide surface is applied to the building. The horizontal spring restricts the movable range of the building to prevent the location of the building from moving much. The lower the friction coefficient of the support material is, the higher seism escape effect is. Thus to display the seism escape effect securely, the support material is required to have a stable low friction coefficient.

Therefore, a fluorine-containing material such as PTFE resin having a low coefficient of friction is frequently used for the slide material.

However, although the PTFE resin has a low friction coefficient, it is inferior in wear resistance and compression characteristic. Thus the PTFE resin is used as a composite material containing a filler such as glass fiber. A favorable escape from a seism is realized by using the PTFE resin for the slide surface. But in designing a seismically isolated apparatus capable of withstanding a big seism and suitable for a large building, it is necessary to consider the increase of the slide speed. Therefore, the conventional material cannot comply with such a requirement. In a slide friction, the friction coefficient increases with the increase of the slide speed. Thus to allow the seismically isolated apparatus to display excellent effect of escape from a big seism, it is necessary to reduce the friction coefficient of the slide surface and reduce the dependency of the friction coefficient on the slide speed.

The larger the building is, the higher the surface pressure is. The PTFE resin is a soft resin. Thus even though resistance to creep is improved by adding a filler, there is a limit in a load-applying capability. Thus under a high load-applied state, a compression deformation amount increases with elapse of time and the contact area on the slide surface increases. Consequently, the friction coefficient increases. The increase of the slide speed and the surface pressure leads to the increase of wear.

SUMMARY OF THE INVENTION

It is an object of the present invention to provide a composition having lubricity capable of supplying a lubricant continuously to the surface of a slide surface and having a low degree of friction and wear, and an additive imparting lubricity to a base material.

It is another object of the present invention to provide a slide bearing formed by molding the composition.

It is still another object of the present invention to provide a retainer for a rolling bearing formed by molding the composition. The retainer for the rolling bearing stabilizes the rotational torque of the rolling bearing at a low value, prevents generation of dust and noise, has preferable mechanical characteristic, and is durable.

It is still another object of the present invention to provide a seismically isolated apparatus reducing the friction coefficient of a material composing a slide surface, having an improved wear resistance thereof, and improved resistance to load.

The composition having lubricity of the present invention comprises a base material, a porous silica, and a lubricant. The porous silica is impregnated with the lubricant. The porous silica has interconnected pores and is spherical and porous. The spherical porous silica is a true spherical silica particle which comprises an aggregation of primary silica particles whose average diameter is in the range of 3–8 nm. The average diameter of said true spherical silica particle is in the range of 0.5–100 $\mu$m.

The other spherical porous silica is a precipitated silica particle that is an aggregation of primary particles whose diameters are not less than 15 nm.

The base material is synthetic resin, a material having rubber elasticity or a material that can be formed as a coating film. The lubricant is at least one lubricating substance selected from the group consisting essentially of lubricating oil, wax, and a greasy substance.

An additive imparting lubricity to a base material comprises porous silica and a lubricant to be impregnated into the porous silica.

The present inventor has found that in adding the lubricant to the base material to obtain a slide material having durable slide characteristic, it is possible to improve the friction and wear characteristics thereof and maintain the friction and wear characteristics by utilizing the porous silica having interconnected pores. The present invention is based on such knowledge.

By adding the porous silica to the base material, the following actions have been recognized:

(1) Because the lubricant can be supplied to a slide interface continuously, it is possible to allow excellent friction and wear characteristics to continue.

(2) The oil absorption capacity in the composition can be increased by adding the lubricant to resin or elastomer in a range in which moldability of the composition can be secured and adding the lubricant-impregnated porous silica to the base material. Thus the addition amount of the lubricant to the resin or the elastomer is larger than the conventional addition amount of the lubricant.

(3) Because the porous silica impregnated with the lubricant is added to the base material, the lubricant component is held by the porous silica. Therefore, compared with the method of adding a large amount of the lubricant to the resinous material, the following disadvantages do not occur: a screw slips in injection molding, metering is unstable, which makes a cycle time long, dimensional accuracy is unstable, the lubricant attaches to the surface of a die, which causes the surface of a molded product to have poor finish.

(4) It is possible to accomplish kneading of combinations of materials that has not been hitherto made, because of poor compatibility between the lubricating oil and the resin as well as the elastomer.

(5) Because the spherical porous silica, especially true spherical silica, is destroyed by a shearing force of a slide interface, it does not injure even a soft slide mating material.

(6) If the lubricant and the reinforcing material are added separately to the base material in using oil-containing resin and a reinforcing material, the lubricant is locally present on the interface between the reinforcing material and the resin. Thus there is a possibility that reinforcing effect cannot be obtained. However, if the lubricant and the reinforcing material are kneaded, with the spherical porous silica impregnated with the lubricant, the lubricant is not present on the interface between the reinforcing material and the resin. Thus the reinforcing effect can be obtained.

The slide product of the present invention is formed from the composition having lubricity. The slide product is a slide bearing and a retainer for holding a rolling element of the rolling bearing. Further the slide product is a seismically isolated apparatus having a slide support disposed between a lower body thereof and an upper body thereof.

In the slide bearing or the retainer for the rolling bearing, the oil-holding porous silica holds most of the lubricant. Thus the lubricant disperses uniformly inside the porous silica. The lubricant held by the porous silica oozes at a uniform speed for a long time on the contact portion between the retainer and the rolling element disposed on the slide surface of the slide bearing or on the surface of the retainer. That is, the lubricant displays preferable lubricating characteristic.

In the case where a lubricating oil-guiding fibrous filler is used in combination with other components, the lubricant contained in the spherical porous silica present inside passes the surface of oil-guiding fiber, namely, on the interface between the synthetic resin and the fiber and oozes to the surface of the retainer at a stable speed for a long time. Thus the lubricant displays preferable lubricating characteristic.

The rolling bearing incorporating the retainer composed of a molded material of the resinous composition has a small rotational torque and little fluctuation in torque. Further the rolling bearing is lubricated favorably for a long time, it is very durable.

The seismically isolated apparatus of the present invention is obtained as a result of research for reducing the coefficient of friction of the slide surface supposing that a big seism has occurred and for reducing the dependency of the coefficient of friction on speed. By using a molded product of a resinous composition containing the lubricant-impregnated porous silica as at least one of slide surfaces, it is possible to obtain the seismically isolated apparatus has a sufficient degree of strength and wear resistance and a low coefficient of friction having a low degree of dependency on speed is obtained owing to the lubrication.

DETAILED DESCRIPTION OF THE PREFERRED EMBODIMENTS

Figure 1:
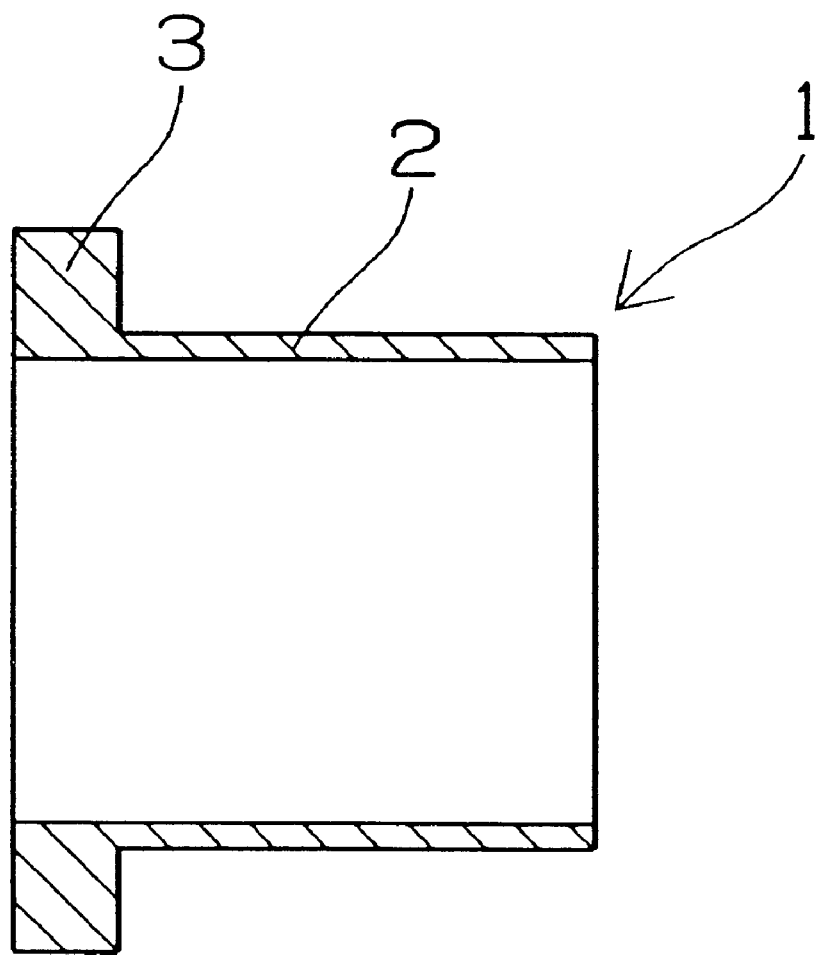
FIG. 1 is a sectional view showing a slide bearing.
Figure 2:
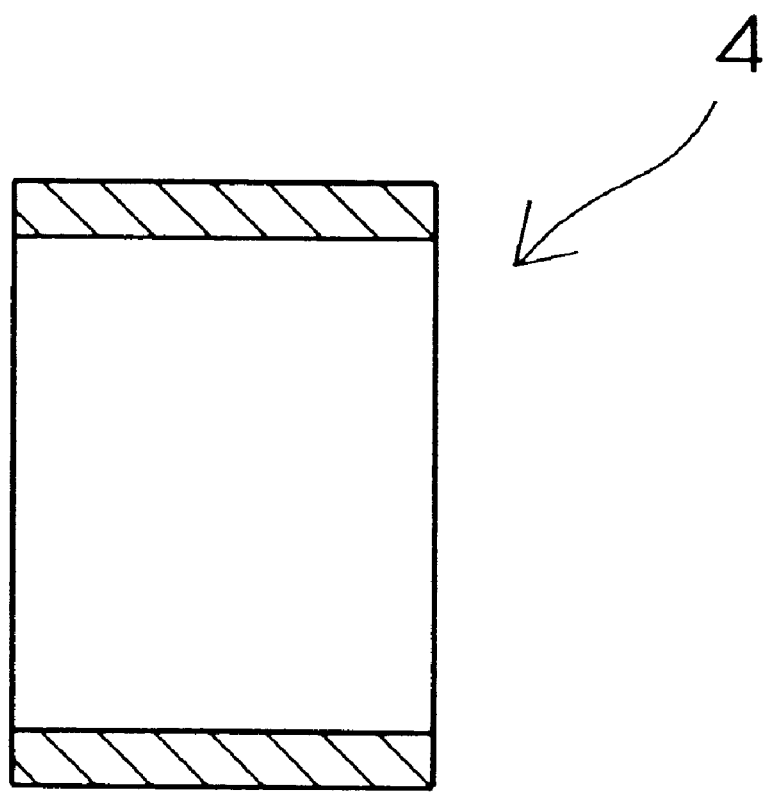
FIG. 2 is a sectional view showing a sleeve.
Figure 3:
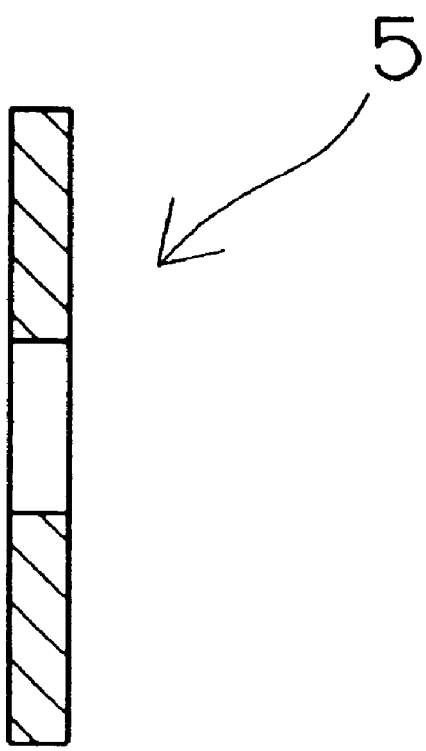
FIG. 3 shows a thrust washer.

The base material that can be used in the present invention includes a resinous material, a material having rubber elasticity, and a material capable of forming a coating film. Each of these materials is used singly or may contain a reinforcing material or the like.

As the resinous material, it is possible to use synthetic resin such as thermoplastic resin and thermosetting resin capable of forming a mode in which it can be used as a slide material. For example, it is possible to use polyethylene resin such as low-density polyethylene, high-density polyethylene, ultra-high-molecular-weight polyethylene, modified polyethylene resin, cross-linked polyolefin resin with humidity, polyamide resin, aromatic polyamide resin, polystyrene resin, polypropylene resin, silicone resin, urethane resin, PTFE resin, chlorotrifluoroethylene resin, tetrafluoroethylene-hexafluoropropylene copolymer resin, tetrafluoroethylene perfluoroalkyl vinyl ether copolymer resin, vinylidene fluoride resin, ethylene tetrafluoroethylene copolymer resin, polyacetal resin, polyethylene terephthalate resin, polybutylene terephthalate resin, polyphenylene ether resin, polycarbonate resin, aliphatic polyketone resin, polyvinyl pyrrolidone resin, polyoxazoline resin, polyphenylene sulfide resin, polyether sulfone resin, polyetherimide resin, polyamideimide resin, polyether ether ketone resin, thermoplastic polyimide resin, thermosetting polyimide resin, epoxy resin, phenol resin, unsaturated polyester resin, and vinyl ester resin. In addition, it is possible to use a mixture of two or more synthetic resins selected from the above-described ones. That is, polymer alloys can be used.

Because the polyamide resin is heat-resistant and oil-resistant and in addition inexpensive, the polyamide resin can be utilized industrially. Thus the polyamide resin is suitable for a material for a retainer for a rolling bearing. As the polyamide resin, it is possible to use aliphatic polyamide resin such as polyhexamethylene adipamide (6,6-nylon), polyhexamethylene azelamide (6,9-nylon), polyhexamethylene sebacamide (6,10-nylon), polyhexamethylene decamide (6,12-nylon), polytetramethylene adipamide (4,6-nylon), polycaprolactam (6-nylon), polylauric lactam (12-nylon), poly-11-aminoundecane (11-nylon); aromatic polyamide resin such as polymethaphenylene isophthalamide, polyparaphenylene terephthalamide, and polymethaxylene adipamide (nylonMXD-6). These polyamide resins can be used singly or as a mixture.

It is possible to use a material which is synthesized by organic synthesizing methods and has rubber elasticity when it is vulcanized at a room temperature. It is also possible to use an elastomer composed of a hard segment and a soft segment. For example, it is possible to use vulcanized rubbers such as acrylonitrile butadiene rubber, isoprene rubber, styrene rubber, butadiene rubber, nitrile rubber, chloroprene rubber, butyl rubber, acrylic rubber, silicone rubber, fluororubber, ethylene propylene rubber, chlorosulfonated polyethylene rubber, chlorinated polyethylene rubber, and epichlorohydrin rubber; and thermoplastic elastomers such as polyurethane elastomer, polyester elastomer, polyamide elastomer, polybutadiene elastomer, and flexible nylon elastomer.

As materials that can form the coating film, it is possible to use the above-described synthetic resin that can dissolve or disperse in an organic solvent. It is possible to use a precondensate forming a high molecular weight in the process of hardening action of a coating film.

The porous silica which can be used in the present invention has interconnected pores and impregnated with a lubricant and can hold it. Powder containing non-crystalline silicon dioxide as its main component can be preferably used as the porous silica. For example, precipitated silica which is an aggregation of primary particles whose diameters are not less than 15 nm is preferable. In addition, true spherical porous silica disclosed in Japanese Patent Application Laid-Open No. 2000-143228 is also preferable.

The true spherical porous silica is obtained by emulsifying a water solution of alkali silicate containing alkali metal salt or alkali earth metal salt in an organic solvent and gelatinizing an emulsified substance with carbon dioxide. The true spherical porous silica is an aggregation of primary particles whose diameter is in the range of 3–8 nm.

The true spherical porous silica is particularly preferable because it has interconnected pores and is destroyed by a shearing force of a slide interface. The average particle diameter of the true spherical porous silica is in the range of 0.5–100 μm. The true spherical porous silica particle having the diameter in this range is capable of holding the lubricant therein and supplying the impregnated lubricant little by little on the slide interface. If the true spherical porous silica particle has an average diameter less than 0.5 μm, it cannot be handled well and is impregnated with an insufficient amount of the lubricant. If the true spherical porous silica particle has an average diameter more than 100 μm, it has poor dispersibility in melted resin and further the aggregation of the primary particles is destroyed by the shearing force applied thereto when the melted resin is kneaded. Thus the spherical state cannot be maintained. In consideration of handleability and impartation of favorable sliding characteristic to the composition having lubricity, it is particularly preferable that the average particle diameter of the spherical porous silica is in the range of 1–20 μm. As such spherical porous silica, Sunsphere (trade name) produced by Asahi Glass Corp. and Got Ball (trade name) produced by Suzuki Yushi Kogyo Corp. are commercially available.

As the porous silica, Microid (trade name) produced by Tokai Kagaku Kogyosho Corp. is commercially available.

The true spherical porous silica particle has characteristics that a specific surface area in the range of 200–900 $m^2/g$ and preferably 300–800 $m^2/g$; a pore volume in the range of 1–3.5 ml/g; a pore diameter in the range of 5–30 nm and preferably 20–30 nm; and an oil absorption capacity in the range of 150–400 ml/100 g and preferably in the range of 300–400 ml/100 g. It is preferable that when the true spherical porous silica particle is dried after it is immersed in water, the pore volume and the oil absorption capacity are kept at not less than 90% of those before it is immersed in water. The specific surface area and the pore volume are measured by nitrogen adsorption method, and the oil absorption capacity is measured in accordance with JIS K5101. It is preferable that the inside of the particle and the outer surface thereof have silanol group (Si—OH) because the particle can hold the lubricant therein easily. The porous silica is capable of making organic and inorganic surface treatment suitable to a matrix.

According to the present invention, depending on a combination of the porous silica and the base material and a mixing ratio therebetween, it is possible to use the porous silica having the average particle diameter less than 100 μm. The configuration of particle is not limited to a specific one. For example, unspherical porous silica can be used if its average particle diameter, specific surface area, and oil absorption capacity lie within the range of those of the spherical porous silica. In view of attacking performance of the composition having lubricity on a slide mating member and kneadability of components of the composition having lubricity, spherical or true spherical particle is preferable. The spherical configuration means an ellipse in which the ratio of the minor axis of a particle to its major axis is in the range of 0.8–1.0. The true spherical configuration means the ratio is approximately 1.0.

The lubricant that can be used in the present invention includes lubricating oil liquid at a room temperature, wax solid at the room temperature, and a greasy substance consisting of the lubricating oil containing a thickener. That is, any substances having lubricating effect can be used.

As the lubricating oil, it is possible to use the following substances conventionally used: mineral oil such as spindle oil, refrigerator oil, turbine oil, machine oil, and dynamo oil; hydrocarbon synthetic oil such as polybutene, poly-α-olefin, alkyl naphthalene, and alicyclic compound; non-hydrocarbon synthetic oil such as ester oil synthesized from natural fats and oils and polyol, phosphoric ester, diester oil, polyglycol oil, silicone oil, polyphenyl ether oil, alkyldiphenyletheroil, alkylbenzene, and fluorinated oil. The lubricating oil can be selected according to a condition in which the composition having lubricity of the present invention is used and required performance. Further it is possible to select the lubricating oil having heat-resistance property in conformity to temperature at which resin is kneaded and molded. In the case where a low friction is required, a preferable result can be obtained by using silicone oil. The silicone oil is particularly preferable because it has affinity for silanol group present on the surface of the spherical porous silica. It is possible to use the silicone oil having or not having functional group.

As the wax, it is possible to use paraffin wax in which the number of carbon is not less than 24, olefin wax in which the number of carbons is not less than 26, alkyl benzene in which the number of carbons is not less than 28, hydrocarbon wax such as micro-crystalline wax, myristic acid, palmitic acid, stearic acid, arachic acid, montanic acid, and unsaturated fatty acid in which the number of carbons is not less than 18, for example, derivative wax of higher fatty acid such as octadecynoic acid and parinaric acid. As the derivative wax of higher fatty acid, it is possible to use (1) higher fatty methyl, in which the number of carbons is not less than 22, such as ethyl behenate and ethyl tricosane, and ethyl ester, and ester of higher fatty acid in which the number of carbons is not less than 16 and higher monohydric alcohol in which the number of carbons is not less than 15, octadecyl stearate ester and higher fatty esters in which the number of carbons is not less than 14 such as higher fatty triglyceride; (2) higher aliphatic fatty amides such as amide palmitate, amide stearate, and amide oleate; (3) salts of higher aliphatic fatty acid such as lithium stearate, and calcium stearate and alkali metal and alkali earth metal.

The greasy substance contains a thickener added to the lubricating oil serving as the base oil. The following thickeners can be used. (1) As soap, calcium soap, sodium soap, lithium soap, barium soap, aluminum soap, and zinc soap. (2) As composite soap, calcium composite soap, sodium composite soap, lithium composite soap, barium composite soap, aluminum composite soap, and zinc composite soap. (3) As non-soap, sodium terephthalate, diurea compound, triurea compound, tetraurea compound, polyurea compound, urea-urethane compound, diurethane compound, silica aerogel, montmorilonite, Benton, PTFE, fluorinated ethylene-propylene copolymer, and boron nitride.

As the mixing ratio among the porous silica, the lubricant, and the base material, it is favorable that the porous silica is in the range of 1–20 vol %, the lubricant is in the range of 5–40 vol %, and the base material is the rest. If the volume percentage of the porous silica is less than 1 vol %, it has a low effect as the oil-holding material. On the other hand, if the volume percentage of the porous silica is more than 20 vol %, the amount of the base material such as base resin is too small. In this case, there is a possibility that the composition has a very low strength. In consideration of the effect and strength of the porous silica as the oil-holding material, it is more favorable that the mixing volume percentage of the porous silica is in the range of 2–15 vol %. If the volume percentage of the lubricant is less than 5 vol %, it has a low degree of lubricating effect. On the other hand, if the volume percentage of the lubricant is more than 40 vol %, the amount of the base resin is small. In this case, there is a possibility that the composition having lubricity has a very low strength. The mixing weight of each component can be computed by the product of its vol % and density. The vol % of the porous silica is computed, supposing that unporous solid silica is used. That is, the vol % of the porous silica is computed by using not the bulk specific gravity of the porous silica but the true specific gravity thereof. Therefore, the actual vol % of the porous silica having the interconnected pores is larger than the above-described Vol %.

As another mode of the composition, the porous silica impregnated with the lubricant may be mixed with the base material. In this case, the mixing amount of the lubricant to be contained in the composition can be determined by the amount of oil which penetrates into the porous silica and the mixing amount of the porous silica. A favorable mixing amount of the lubricant is not less than 40 vol % of the porous silica. If the inside of the porous silica is not filled with an appropriate amount of the lubricant, the lubricating effect of the lubricant cannot be obtained. If the mixing amount of the lubricant is too large, the lubricant is incapable of penetrating into the spherical porous silica sufficiently and disperses in a molding material. Consequently, depending on the kind of resin, there is a possibility that the strength of the molding material deteriorates or a disadvantage occurs in a molding time. In this case, preferably, the mixing amount of the porous silica impregnated with the lubricant is in the range of 1–20 vol % with respect to the total volume of composition.

The composition may contain appropriate fillers to improve its mechanical property by improving its friction and wear characteristics. As the filler, it is possible to use the following substances: fibers such as glass fiber, pitch carbon fiber, PAN carbon fiber, aramid fiber, alumina fiber, boron fiber, silicon carbide fiber, silicon nitride fiber, boron nitride fiber, asbestos, quartz wool, fibers such as metal fiber or a cloth obtained by knitting the metal fibers, minerals such as calcium carbonate, lithium phosphate, lithium carbonate, calcium sulfate, lithium sulfate, talc, silica, clay, and mica; inorganic whiskers such as titanium oxide whisker, potassium titanate whisker, aluminum borate whisker, and calcium sulfate whisker; carbon black; graphite; thermosetting resin such as polyester fiber, polyimide resin, and polybenzimidazole resin.

To improve sliding property of the composition, it may contain the following substances: amino acid compound, polyoxybenzoyl polyester resin, polybenzimidazole resin, liquid crystal resin, pulp of aramid resin, PTFE, boron nitride, molybdenum disulfide, and tungsten disulfide.

To improve the thermal conductivity of the composition, it may contain carbon fiber, metal fiber, graphite powder or zinc oxide. It is possible to use these materials in combination with a plurality of the fibers. The composition lubricity may contain an appropriate amount of agents applicable to synthetic resin in such an extent that the agents do not prevent the effect of the present invention from being displayed. For example, the composition may contain the following lubricants for industrial use: parting agent, fire-retardant agent, antistatic agent, weatherable modifier, antioxidant, colorant, and electrical conductivity imparting agent. The method of mixing these agents with other components of the composition is not limited to a specific one.

The method of kneading a lubricating resinous composition is carried out by utilizing a known method. For example, after components are mixed with one other by a mixer such as a Henschel mixer, a ball mill or a tumbler mixer, the mixture is supplied to an injection molding machine having favorable melt mixability or a melt extruder (for example, biaxial extruder). Alternatively, the components are melt-mixed by utilizing a heat roller, a kneader, a Banbury mixer or a melt extruder. As another kneading method, it is possible to carry out vacuum molding, blow molding, foam molding, multi-layer molding or heating compression molding.

In kneading the resin, the porous silica, and the lubricant with one another, a particular kneading order is not specified, but it is preferable that the porous silica and the lubricant are mixed with each other in advance, the porous silica is impregnated with oil, and then the porous silica and the base resin serving as the base material are kneaded.

It is preferable to dry the porous silica before it is kneaded with the base resin, because the porous silica is absorbent of moisture and water. The method of drying the porous silica is not limited to a specific one. It is possible to adopt the method of drying it with an electric oven or vacuum drying method.

In the case of the lubricating coating composition, after the porous silica impregnated with the lubricant is added to the resinous component, the mixture is mixed with a coating liquid. In this case, conventional coating treatment may be used. A particular method of carrying out the coating treatment is not specified, but spray method, electrostatic coating method or fluidization dip coating method can be used.

If the viscosity of the lubricant is high in mixing the porous silica and the lubricant with each other in advance, it is difficult for oil to penetrate into the spherical porous silica. In this case, the following method can be used: the lubricant is diluted with an oil-dissolvable solvent, the lubricant-diluted liquid is penetrated into the porous silica, and the liquid is dried gradually to vaporize the solvent. Thereby the porous silica is impregnated with the lubricant.

As another effective method, the porous silica is immersed in the lubricant in a vacuum container and the container is vacuumized to forcibly penetrate the lubricant into the porous silica.

As still effective method, in the case where the lubricant is solid at the room temperature, it is heated to a suitable temperature to melt it to thereby impregnate the porous silica with the lubricant. As still another effective method, in the case where the lubricant is liquid at the room temperature and has a high viscosity, it is heated to a suitable temperature to reduce its viscosity to thereby impregnate the porous silica with the lubricant. As still another effective method, liquid resin such as unsaturated polyester resin is mixed with oil-containing spherical porous silica to impregnate woven cloths with the mixture. Thereafter, the woven cloths are layered one upon another to use them as a resinous slide member.

So long as the lubricity of the composition does not deteriorate, it is possible to modify an intermediate product or a finished product by chemical treatment such as annealing or physical treatment to improve the characteristics thereof.

The composition is used as slide portions. For example, the present invention is applied to slide parts such as a slide bearing, a gear, a sliding seat, a seal ring, a roller, a carriage, and the like; and slide members such as a retainer for a rolling bearing, solid lubricant, a seal of the rolling bearing, a seal of a direct-acting bearing, a spacer to be mounted between balls of a ball thread, and a lace of the rolling bearing.

The additive imparting lubricity to a base material is obtained by adding the lubricant to the porous silica. The additive can be used as a component of the composition having lubricity including resins, rubbers, and coating films.

The embodiments of the slide bearing of the present invention will be described below with reference to FIGS. 1 through 4.

A slide bearing 1 shown in FIG. 1 has a cylindrical bearing body 2 and a flange 3 mounted on the body 2. The body 2 and the flange 3 are formed by molding the composition. A sleeve 4 shown in FIG. 2 and a thrust washer 5 shown in FIG. 3 have also the function of the slide bearing and also formed by molding the composition.

Figure 4:
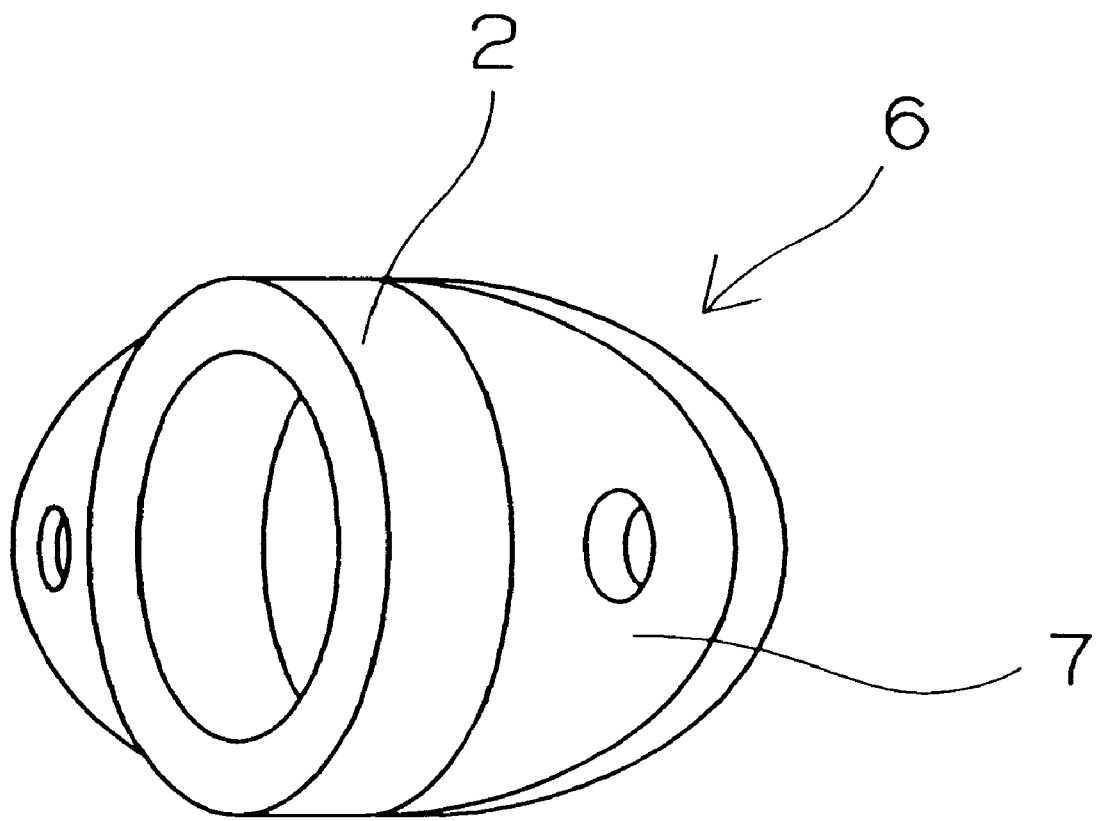
FIG. 4 is a perspective view showing the slide bearing.

A slide bearing 6 shown in FIG. 4 has the cylindrical bearing body 2 and a stopping portion 7 mounted on the body 2. The cylindrical bearing body 2 and the stopping portion 7 are formed by molding the composition.

Figure 5:
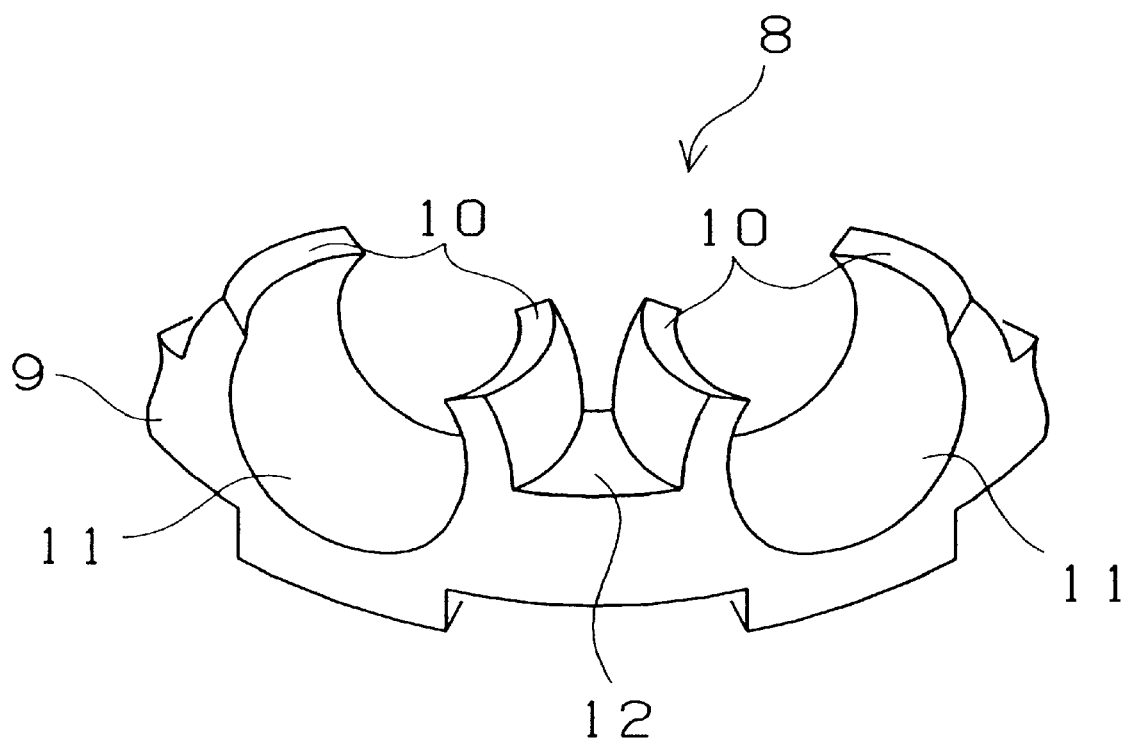
FIG. 5 is a partly enlarged perspective view showing a retainer for a rolling bearing.

FIG. 5 shows an example of a retainer for the rolling bearing having a crown-shaped retainer formed by integrally molding the composition. A retainer 8 for the rolling bearing has a pair of opposed erected portions 10 formed on an upper surface of an annular retainer body 9 at a certain interval in the circumferential direction of the retainer 8. Each erected portion 10 consists of a pair of claws. The claws are curved in a direction in which they approach each other. A rolling element-holding pocket 11, namely, a ball-holding pocket 11 is formed between the claws of each erected portion 10. A flat portion 12 is formed between the erected portions 10 as a reference erection surface of the erected portions 10.

In the case where the composition is used as the retainer for the rolling bearing, the mixing amount of the lubricant or the lubricating oil is in the range of 1–50 vol % and preferably in the range of 5–45 vol % with respect to the total volume of synthetic resinous composition. If the mixing amount of the lubricating oil is less than 1 vol %, oil is absolutely short. In this case, because the amount of oil to be supplied from the retainer to the rolling element is insufficient, the durability of the rolling bearing deteriorates. If the mixing amount of the lubricating oil is more than 45 vol %, there is a great reduction in the mechanical property of the retainer. In the case where thickener-containing grease is used, its mixing amount is the same as that of the lubricating oil.

It is preferable that the composition contains a fibrous oil-guiding material. As the oil-guiding material which can be used in the present invention, it is possible to use glass fiber, pitch carbon fiber, PAN carbon fiber, aramid fiber, alumina fiber, boron fiber, silicon carbide fiber, boron nitride fiber, silicon nitride fiber, metal fiber, hollow fiber made of polyester (Lupro produced by Toyobo Corp., Aero-capsule-dry produced by Teijin Corp.). The glass fiber is preferable as the oil-guiding material when it is used as an industrial material because it is inexpensive and easy to obtain.

Favorably the diameter of the fiber of the oil-guiding material is in the range of ø3–25 µm, and its length of the fiber is in the range of 100–6000 µm. If a narrow fiber having a diameter less than ø3 µm, the fiber is liable to break when the composition are kneaded and molded, and fibers present in the retainer for the rolling bearing are very short. Thus the oil-guiding material does not perform its function. If a thick fiber having a diameter more than ø25 µm is adopted, the specific surface area of the fiber becomes smaller than that of a predetermined fiber. Thus the oil-guiding material does not perform its function. From such a tendency, more favorable fiber length is in the range of ø5–20 µm.

If the length of the fiber is less than the lower limit of the above-described range, the oil-guiding material is not effective. On the other hand, if the length of the fiber is more than the upper limit of the above-described range, moldability of the composition having lubricity is low. In consideration of such a tendency, more favorably, the length of the fiber is in the range of 100–5000 µm.

The mixing amount of the oil-guiding material with respect to the total volume of composition is in the range of 0–35 vol % and favorably in the range of 0–30 vol %. If the mixing amount thereof is more than 35 vol %, the moldability of the composition deteriorates. More favorably, the mixing amount thereof is in the range of 0–25 vol %.

As a solid lubricant for supplying the lubricant to the rolling element and the rolling surface by partly attaching it to the retainer made of an iron plate or a copper alloy, it is possible to form the retainer for the rolling bearing by using the resinous composition.

So long as the lubricity of the composition having lubricity does not deteriorate, it is possible to modify an intermediate product or a finished product by chemical treatment such as annealing or physical treatment to improve the characteristics thereof. It is also possible to prevent resin from being absorbed by performing the annealing treatment in the lubricant.

It is possible to performing oil plating for the retainer-incorporated rolling bearing obtained by molding the resinous composition. That is, the rolling bearing is immersed in a liquid in which the lubricating oil or grease has been diluted to a proper concentration in a suitable volatile organic solvent to form a uniform film on the surface of the rolling bearing. Lubricating oil for the use of the oil plating may be identical to the above-described lubricating oil that can be contained in the resinous composition or different therefrom. More specifically, the following lubricating oils can be suitably used: ester oil such as 2-ethylhexyl sebacate, polyolester oil such as formed by esterifying pentaerythritol and trimethylolpropane, mineral oil, poly-α-olefin oil, and alkyldiphenyl ether oil. It is possible to add an appropriate amount of a corrosion-resistant agent, an anti-oxidant or an oiliness improver to the lubricating oil for the use of the oil plating. As the corrosion-resistant agent, barium sulfonate or calcium sulfonate can be used. As the anti-oxidant, 2,6-di-tert-butyl-p-cresol can be used. As oiliness improver, oleic acid or tricresyl phosphate can be used.

A grease-sealed bearing having a long life can be obtained if it incorporates the retainer for the rolling bearing of the present invention.

Figure 6:
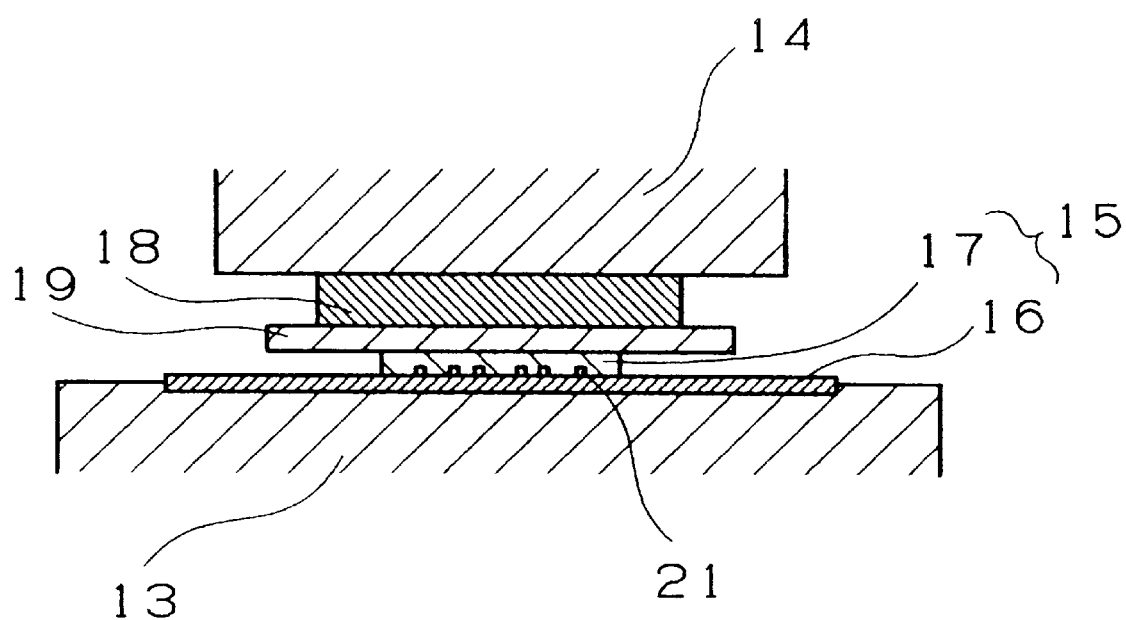
FIG. 6 is a sectional view showing a slide support portion of a seismically isolated apparatus.
Figure 7:
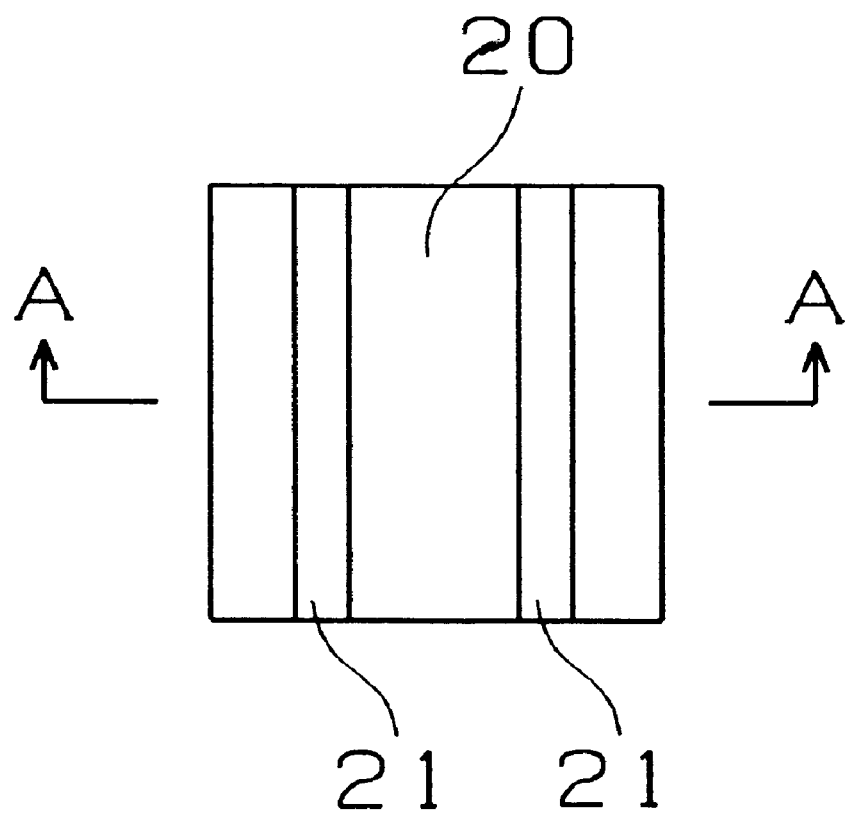
FIG. 7 is a plan view showing a slide material.
Figure 8:
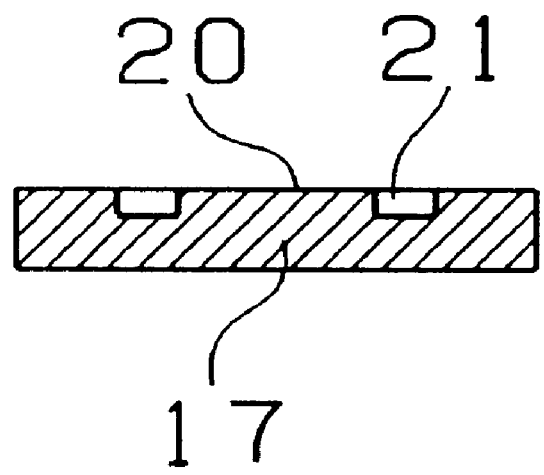
FIG. 8 is a sectional view taken along a line A—A of FIG. 7.
Figure 9:
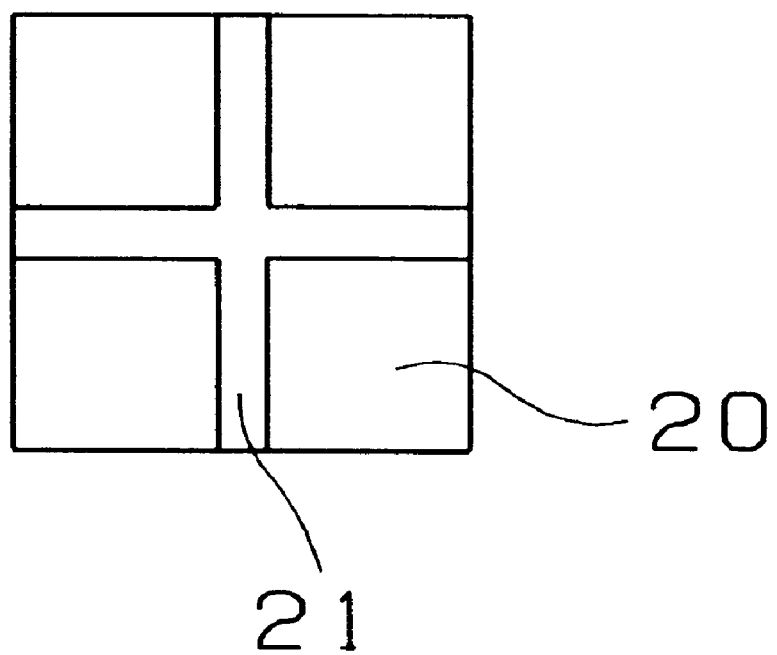
FIG. 9 is a plan view showing the slide material.
Figure 10:
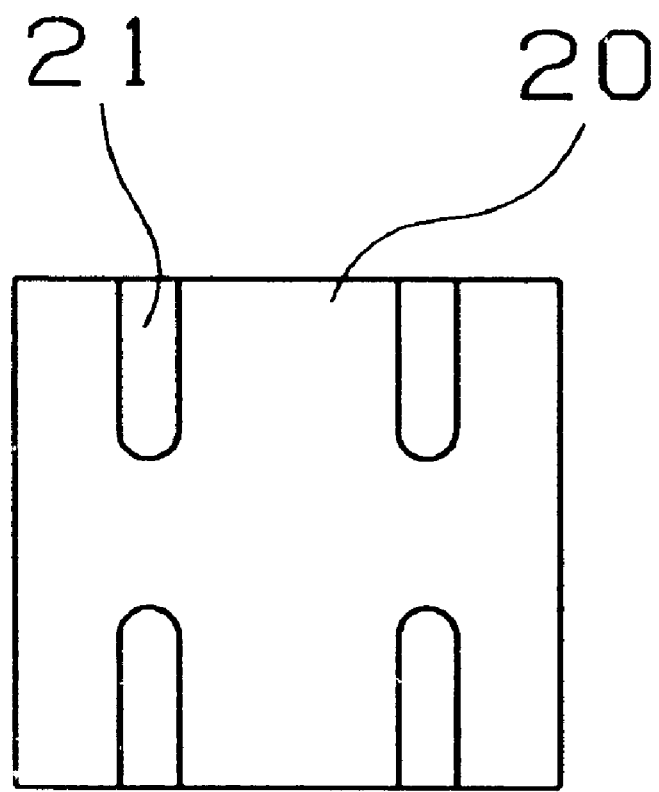
FIG. 10 is a plan view showing the slide material.
Figure 11:
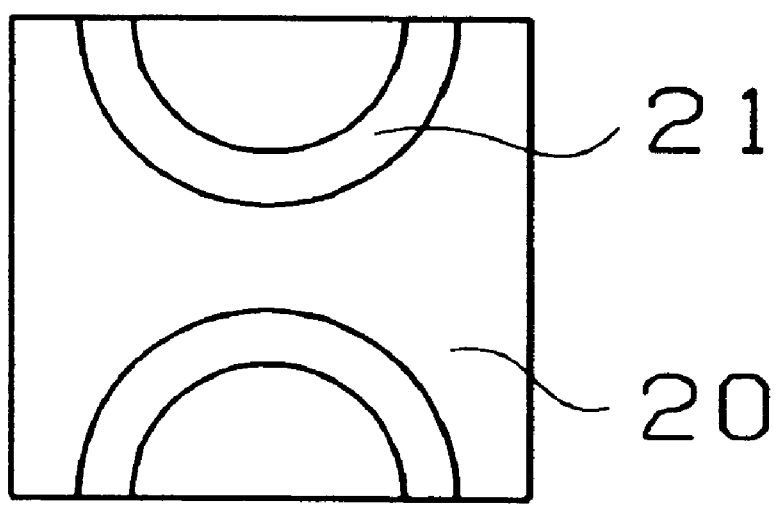
FIG. 11 is a plan view showing the slide material.
Figure 12:
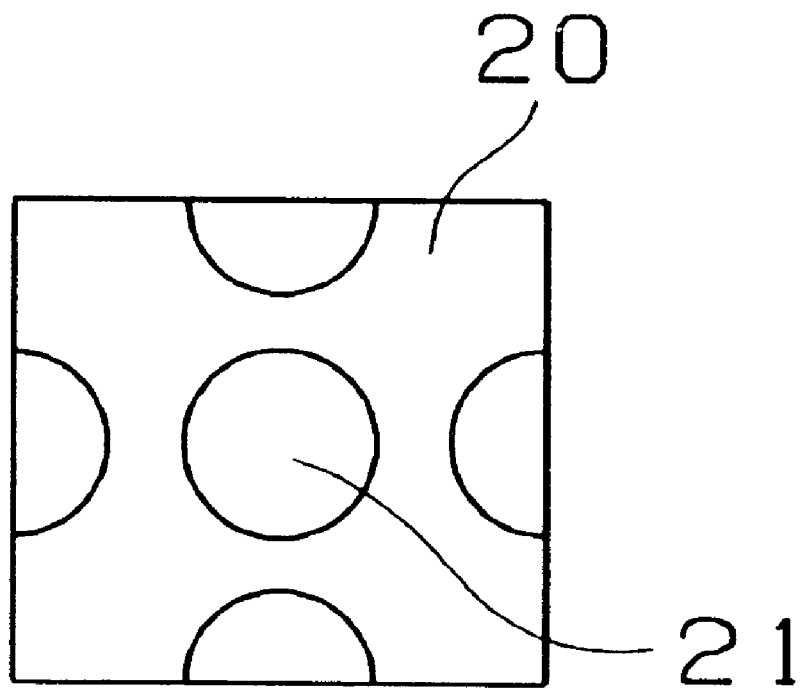
FIG. 12 is a plan view showing the slide material.
Figure 13:
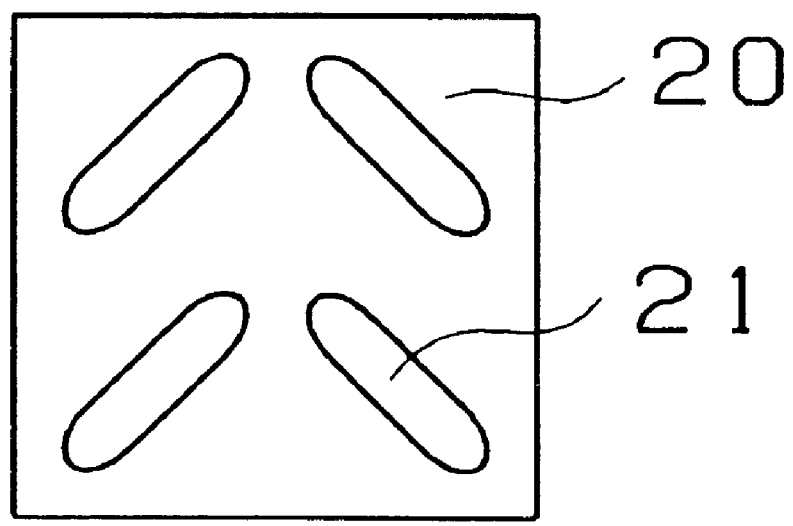
FIG. 13 is a plan view showing the slide material.

The seismically isolated apparatus of the present invention will be described below with reference to FIG. 6.

A slide support 15 is disposed between a lower body 13 and an upper body 14. The slide support 15 has a smooth plate 16 and a slide member 17. A slide surface of the smooth plate 16 and that of the slide member 17 are in contact with each other. Reference numeral 18 denotes a member, made of laminated rubber layers or the like, which elastically deforms to a maximum static friction of the slide member 17. Reference numeral 19 denotes an intermediate plate. The elastically deformable member 18 and the intermediate plate 19 are provided if necessary. Reference numeral 21 denotes a concavity formed on the slide surface of the slide member 17.

At least one of the smooth plate 16 and the slide member 17 constituting the slide support 15 is obtained by molding a resinous composition essentially containing the porous silica and the lubricant. It is preferable that a portion of the slide member 17 disposed on the side of the upper body 14 is formed by molding the resinous composition containing the porous silica and the lubricant. This is because the concavity 21 can be formed easily on the slide surface of the slide member 17. Examples of the concavity 21 are shown in FIGS. 7 through 14.

Figure 14:
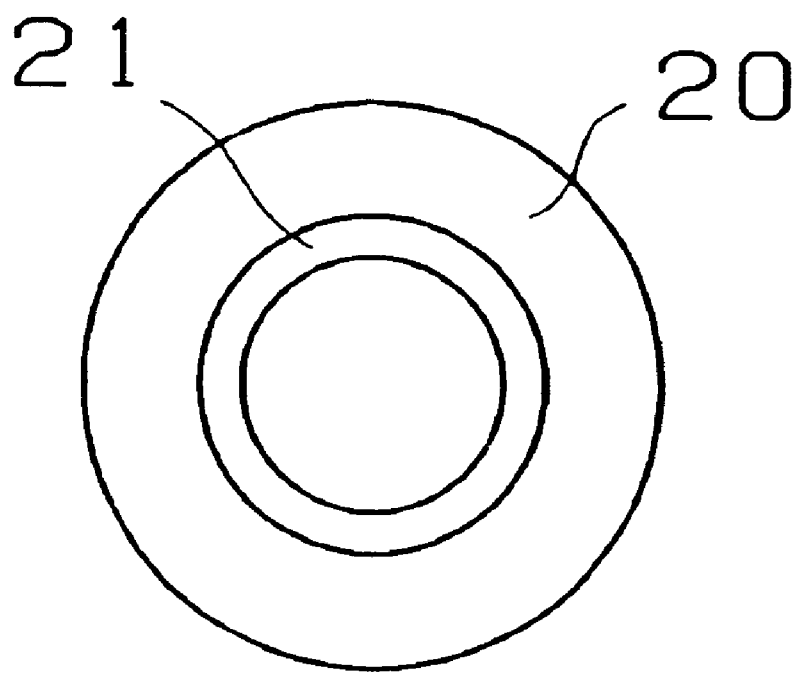
FIG. 14 is a plan view showing the slide material.

The concavity 21 is formed on the slide surface 20 of each slide member 17. Owing to the formation of the concavity 21, the slide surface 20 is capable of keeping supplying a sufficient amount of the lubricant to the slide surface. Further the slide surface 20 accelerates discharge of worn powder and prevents accumulation of frictional heat. As shown in FIG. 14, the slide member 17 may be circular, and the concavity 21 may be so configured that an open end is not formed on the slide surface 20.

The mode of the slide member 17 is not limited to a particular one. As shown in FIGS. 7 to 14, the slide member 17 can be used independently by processing a flat slide plate into a predetermined configuration. If a higher strength is required, an FRP (fiber reinforced plastics) reinforced with metal, monomer cast nylon, glass fiber or a wooden material is processed into a necessary configuration to form a back plate, and the back plate is bonded to the flat slide plate.

The smooth plate 16 can be used if it does not have a projection on its surface and is flat and hard. For example, preferably, the smooth plate 16 is a resinous plate made of the above-described resinous composition, a metal plate, a ceramic plate, a hard resinous plate made of polyimide resin, and a plate made of hard PTFE resin to which a filler is added. Most favorably, the smooth plate 16 is made of a stainless steel in consideration of corrosion prevention, manufacturing cost, and processability.

The smooth plate 16 has a surface roughness of in the range of 0.05–0.50 μm indicated by a maximum height (Ry) on its slide surface. It is preferable that the surface roughness is in the range of 0.10–0.20 μm. The maximum height (Ry) is a value defined by JIS B0601. By setting the maximum height (Ry) to the above range, a suitable amount of the lubricant can be held on the slide surface between the smooth plate and the slide material. Accordingly, a suitable amount of the lubricant can be held on the entire slide surface, and thus initial sliding performance can be improved. If the maximum height (Ry) is less than 0.05 μm, the manufacturing cost will be high and maintenance will be difficult. On the other hand, if the maximum height (Ry) is more than 0.50 μm, the wear characteristic of the slide material will deteriorate.

To reduce friction, it is possible to apply a coating film made of fluorine-containing polymer or organopolysiloxane to the surface of the smooth plate 16.

The seismically isolated apparatus composed of the above-described materials is not limited to a particular configuration, but a suitable mode should be adopted according to related devices and a housing. The resinous composition has a very low coefficient of friction because it contains the lubricant. As the porous silica is impregnated with the lubricant, the resinous composition hardly deteriorates in its strength and wear resistance, although the resinous composition contains the lubricant. The seismically isolated apparatus displays performance superior to the conventional one because the former includes the above-described material.

EXAMPLE 1

As the porous silica, Sunsphere H32 (trade name, abbreviated as Si-A in table) produced by Asahi Glass Corp. was prepared. As polyethylene resin serving as the base resinous material, Lubmer L5000 (trade name, abbreviated as PE in table) produced by Mitsui Chemicals Incorp. was prepared. As silicone oil serving as the lubricant, KF96H (trade name) produced by Shinetsu Silicone Corp. was prepared. 3 vol % of the porous silica and 10 vol % of the silicone oil were mixed with each other for the total volume of resinous composition in advance. The mixture and the polyethylene resin were melted and kneaded by using a biaxial extruder to prepare a pellet. The pellet was injection-molded to prepare a pin having a size of ø3 mm×4 mm as the slide material specimen. A surface of the specimen having the dimension of ø3 mm was brought into contact with a rotary disk to conduct a friction/wear test in the following conditions. Table 3 shows the results.

The conditions for the friction/wear test are shown below:

Mating material: aluminum alloy A5056 (Ra=0.8 µm)

Surface pressure: 6 MPa

Circumferential speed: 4.2 m/min.

Temperature: 30° C.

Time: 20 h

As the evaluation method, the wear amount of the pin was computed from the difference between the length of the pin before and after the test. The moldability and the dynamic coefficient of friction were measured when the test terminated. The damage state of the surface of the mating material was measured after the test terminated. The state of the mating material was marked as ○ if the mating material was not damaged visually. The state of the mating material was marked as x if the mating material was damaged visually. Regarding the moldability, the example in which the components could be kneaded and the pellet could be injection-molded without problem was marked as ○; the example in which the screw had unfavorable sliding, the pellet had defective biting, and the roughness of the surface of a molding material was insufficient owing to attachment of oil to the die was marked as Δ. The example in which the pellet could not be molded was marked as x.

EXAMPLE 2-EXAMPLE 13

By using materials and the mixing ratio shown in table 1, a specimen was prepared as the slide material of each of the examples 2 through 13 in a manner similar to that of the example 1. A friction/wear test was conducted for each specimen in the same condition as that of the example 1. Table 3 shows the results. Table 5 shows the materials used for the specimens and the abbreviations thereof.

EXAMPLE 14-EXAMPLE 17

By using materials and the mixing ratio shown in table 1, a specimen was prepared as the slide material of each of the examples 2 through 13 in a manner similar to that of the example 1. Except that the material for the mating material, namely, the disk was changed from aluminum alloy A5056 to stainless steel SUS304 (Ra=0.8 µm), a friction/wear test was conducted for each specimen in the same condition as that of the example 1. A dumbbell specimen was prepared for each of the examples 14 through 17 to measure their bending strengths in conformity to ASTM-D790. Table 3 shows the results. Table 5 shows the materials used for the specimens.

EXAMPLE 18

As the porous silica, Sunsphere H52 (trade name, abbreviated as Si—B in table) produced by Asahi Glass Corp was prepared. As vinyl ester resin serving as the base resinous material, Ester H811 (abbreviated as VE in table) produced by Mitsui Chemicals Incorp. was prepared. As the silicone oil serving as the lubricant, KF96H-6000 (kinematic viscosity at 25° C.: 6000 cSt) produced by Shinetsu Silicone Corp. was prepared. With a mixer, 1.5 vol % of the porous silica and 7.5 vol % of the silicone oil were mixed with each other for the total volume of resinous composition in advance. The mixture was added to 55 vol % of the vinyl ester resin. The components were uniformly mixed and stirred. A hardening agent and a hardening accelerator were added to the mixture. The components were mixed sufficiently with a mixer. Thereafter, a woven cloths [plan weave, warp (unit of thread thickness): 30/2, weft (unit of thread thickness): 20/2, density (warp×weft, number of threads/inch): 52×40] made of spun polyethylene terephthalate were layered and impregnated with the mixture by hand lay-up method. The mixture was hardened to prepare a laminated plate. The laminated plate was machined to prepare a pin of ø3 mm×4 mm as a specimen (laminated surface is parallel to end surface of pin). A friction/wear test was conducted for the specimen in the same condition as that of the example 1. Table 3 shows the results.

EXAMPLE 19

As the porous silica, Sunsphere H52 (trade name, abbreviated as Si—B in table) produced by Asahi Glass Corp. was prepared. As epoxy resin serving as the base resinous material, two-part type epoxy resin (main agent: 2057+ hardening agent 2191B) (abbreviated as EP in table) produced by Three-Bond Corp. was prepared. As the silicone oil serving as the lubricant, KF96H-6000 (kinematic viscosity at 25° C.: 6000 cSt) produced by Shinetsu Silicone Corp. was prepared. With a mixer, 5 vol % of the porous silica and 20 vol % of the silicone oil with respect to the total volume of resinous composition were mixed with each other in advance. The mixture was added to the epoxy resin consisting of a mixture of a main agent and a hardening agent. The liquid mixture was applied to an end surface of an aluminum pin specimen having a dimension of ø3 mm×4 mm in a thickness of about 30 µm to coat the end surface of the pin. The liquid mixture was heated at 100° C. for two hours and hardened. Thereafter, the liquid mixture was machined to adjust the thickness of the coated layer to 15 µm. A friction/wear test was conducted for the specimen for an hour in the same condition as that of the example 1. The results are shown in table 3.

EXAMPLE 20

A pin was prepared as the specimen of the example 20 by using the same mixing ratio and method as those of the example 13, except that instead of Sunsphere L31 (abbreviated as Si-E in table) which is the spherical porous silica, Microyd 384 (trade name abbreviated as Si-G in table) produced by Tokai Kagaku Kogyo Corp. which is the unspherical porous silica was used as the porous silica. Evaluation was made by a method similar to that of the example 1. Table 1 shows the mixing ratio. Table 3 shows the evaluated results. Table 5 shows the characteristics of the mixing materials used for the specimen.

EXAMPLES 21-EXAMPLES 23

As the porous silica, Sunsphere H52 produced by Asahi Glass Corp. was prepared. As the silicone oil serving as the lubricant, KF96H produced by Shinetsu Silicone Corp. was prepared. 1 vol part of the porous silica and 4 vol parts of the silicone oil were mixed with each other sufficiently to prepare an additive imparting lubricity to base material. The prepared additive was powdery and could be used as an additive to a resinous material. The additive was evaluated as a resinous composition by adding to the resinous material.

Table 6 shows the mixing ratio between the additive and the resinous material. As the resinous material, the materials shown in table 5 were used. The additive and the resinous material were melted and mixed with each other at the mixing ratio shown in table 6 and kneaded with a biaxial extruder to prepare a pellet. Using the pellet, the same specimen as that of the example 1 was prepared as the slide material of each of the examples 21–23. Except that the surface pressure was set to 3 Mpa, a friction/wear test was conducted for each specimen in the same condition and evaluation method as those of the example 1. Table 6 shows the results.

EXAMPLE 24

The additive obtained in the example 21 was added to the epoxy resin used in the example 19. The same specimen as that of the example 19 was prepared as the slide material of the example 24. Except that the surface pressure was set to 3 Mpa, a friction/wear test was conducted for the specimen in the same condition and evaluation method as those of the example 1. Table 6 shows the mixing ratio and evaluated result.

COMPARISON EXAMPLE 1-COMPARISON EXAMPLE 4

A pin serving as the specimen of the comparison examples 1–4 was formed from polyethylene resin (abbreviated as PE in table), polyamide-6-resin (abbreviated as PA6 in table) polybutylene terephthalate (abbreviated as PBT in table), and polyacetal resin (POM) respectively by a method similar to that used in the example 1. A friction/wear test was conducted for each specimen in the same condition as that of the example 1. Table 2 shows the mixing ratio. Table 4 shows the test results. A dumbbell specimen was prepared from the polybutylene terephthalate (abbreviated as PBT in table) to measure its bending strength in conformity to ASTM-D790. The result is shown in table 4.

COMPARISON EXAMPLE 5

Silicone oil was added to the polybutylene terephthalate (abbreviated as PBT in table) at the ratio shown in table 2. A pin serving as the specimen of the comparison example 5 was prepared by a method similar to that used in the example 1. A friction/wear test was conducted for the pin in the same condition as that of the example 1. Table 2 shows the mixing ratio. Test results are shown in table 4.

COMPARISON EXAMPLE 6-COMPARISON EXAMPLE 8

Silicone oil, activated charcoal, and unporous silica were added to the polybutylene terephthalate (abbreviated as PBT in table) at the ratio shown in table 2 to prepare a pin serving as the specimen of each of the comparison examples 6–8 by a method similar to that used in the example 1. A friction/wear test was conducted in the same condition as that of the example 1. Test results are shown in table 4.

COMPARISON EXAMPLES 9 and 10

Silicone oil and unporous silica or ester oil were added to the polybutylene terephthalate (abbreviated as PBT in table) at the ratio shown in table 2. Because the mixture contained the silicone oil at 20 vol % which was comparatively large, a pin serving as the specimen similar to that of the example 1 could not be prepared.

COMPARISON EXAMPLE 11-COMPARISON EXAMPLE 14

A pin serving as the specimen was prepared at the mixing ratio shown in table 2 in a manner similar to that of the example 1. Except that the material for the mating material, namely, the disk was changed from aluminum alloy A5056 to stainless steel SUS304 (Ra=0.8 μm), a friction/wear test was conducted for each specimen in the same condition as that of the example 1. Test results are shown in table 4. The details of the materials used for each specimen are shown in table 5. A dumbbell specimen was prepared for each of the comparison examples 11 through 14 to measure their bending strengths in conformity to ASTM-D790. Results are shown in table 4.

COMPARISON EXAMPLE 15-COMPARISON EXAMPLE 22

Using polyethylene resin (abbreviated as PE in table), polyamide-6-resin (abbreviated as PA6 in table), and polyacetal resin (POM), a pin was intended to be formed as the specimen of the comparison examples 15–22 at the mixing ratio shown in the table 6 by a method similar to that used in the example 1. A friction/wear test was conducted for each specimen in the same condition as that of the example 1. In the comparison examples 15–17, the base resin and the oil separated from each other during the kneading time. Thus the pin of the comparison examples 15–17 could not be formed.

TABLE 1

| Ingredient (vol %) | Example | | | | | | | | | |
|---|---|---|---|---|---|---|---|---|---|---|
|  | 1 | 2 | 3 | 4 | 5 | 6 | 7 | 8 | 9 | 10 |
| PE | 87 | — | — | — | — | — | — | — | 75 | 75 |
| PA6 | — | 87 | — | — | — | — | — | — | — | — |
| PBT | — | — | 87 | — | 75 | 50 | 55 | 45 | — | — |
| POM | — | — | — | 87 | — | — | — | — | — | — |
| VE | — | — | — | — | — | — | — | — | — | — |
| EP | — | — | — | — | — | — | — | — | — | — |
| Si - A | 3 | 3 | 3 | 3 | 5 | 10 | — | — | 5 | — |
| Si - B | — | — | — | — | — | — | — | — | — | 5 |
| Si - C | — | — | — | — | — | — | — | — | — | — |
| Si - D | — | — | — | — | — | — | — | — | — | — |
| Si - E | — | — | — | — | — | — | 15 | 15 | — | — |
| Si - F | — | — | — | — | — | — | — | — | — | — |
| Si - G | — | — | — | — | — | — | — | — | — | — |
| Activated charcoal | — | — | — | — | — | — | — | — | — | — |
| Silicone oil | 10 | — | 10 | — | 20 | 20 | 30 | 40 | 20 | 20 |
| Ester oil | — | 10 | — | 10 | — | — | — | — | — | — |
| PTFE | — | — | — | — | — | — | — | — | — | — |
| Graphite | — | — | — | — | — | — | — | — | — | — |
| Calcium carbonate | — | — | — | — | — | — | — | — | — | — |
| Glass fiber | — | — | — | — | — | — | — | — | — | — |
| PET woven cloth | — | — | — | — | — | — | — | — | — | — |

| Ingredient (vol %) | Example | | | | | | | | | |
|---|---|---|---|---|---|---|---|---|---|---|
|  | 11 | 12 | 13 | 14 | 15 | 16 | 17 | 18 | 19 | 20 |
| PE | 75 | 75 | 75 | — | — | — | — | — | — | 75 |
| PA6 | — | — | — | — | — | — | — | — | — | — |
| PBT | — | — | — | 77 | 77 | 77 | 77 | — | — | — |
| POM | — | — | — | — | — | — | — | — | — | — |
| VE | — | — | — | — | — | — | — | 55 | — | — |
| EP | — | — | — | — | — | — | — | — | 75 | — |
| Si - A | — | — | — | 3 | 3 | 3 | 3 | — | — | — |
| Si - B | — | — | — | — | — | — | — | 1.5 | 5 | — |
| Si - C | 5 | — | — | — | — | — | — | — | — | — |
| Si - D | — | 5 | — | — | — | — | — | — | — | — |
| Si - E | — | — | 5 | — | — | — | — | — | — | — |
| Si - F | — | — | — | — | — | — | — | — | — | — |
| Si - G | — | — | — | — | — | — | — | — | — | 5 |
| Activated charcoal | — | — | — | — | — | — | — | — | — | — |
| Silicone oil | 20 | 20 | 20 | — | — | — | — | 7.5 | 20 | 20 |
| Ester oil | — | — | — | 10 | 10 | 10 | 10 | — | — | — |
| PTFE | — | — | — | 10 | — | — | — | — | — | — |
| Graphite | — | — | — | — | 10 | — | — | — | — | — |
| Calcium carbonate | — | — | — | — | — | 10 | — | — | — | — |

TABLE 1-continued

| | | | | | | | | | |
|---|---|---|---|---|---|---|---|---|---|
| Glass fiber | — | — | — | — | — | — | 10 | — | — |
| PET woven cloth | — | — | — | — | — | — | — | 36 | — |

TABLE 2

| | Comparison Example | | | | | | |
|---|---|---|---|---|---|---|---|
| Ingredient (vol %) | 1 | 2 | 3 | 4 | 5 | 6 | 7 |
| PE | 100 | — | — | — | — | — | — |
| PA6 | — | 100 | — | — | — | — | — |
| PBT | — | — | 100 | — | 90 | 87 | 87 |
| POM | — | — | — | 100 | — | — | — |
| VE | — | — | — | — | — | — | — |
| EP | — | — | — | — | — | — | — |
| Si - A | — | — | — | — | — | — | — |
| Si - B | — | — | — | — | — | — | — |
| Si - C | — | — | — | — | — | — | — |
| Si - D | — | — | — | — | — | — | — |
| Si - E | — | — | — | — | — | — | — |
| Si - F | — | — | — | — | — | — | 3 |
| Si - G | — | — | — | — | — | — | — |
| Activated charcoal | — | — | — | — | — | 3 | — |
| Silicone oil | — | — | — | — | 10 | 10 | 10 |
| Ester oil | — | — | — | — | — | — | — |
| PTFE | — | — | — | — | — | — | — |
| Graphite | — | — | — | — | — | — | — |
| Calcium carbonate | — | — | — | — | — | — | — |
| Glass fiber | — | — | — | — | — | — | — |
| PET woven cloth | — | — | — | — | — | — | — |

| | Comparison Example | | | | | | |
|---|---|---|---|---|---|---|---|
| Ingredient (vol %) | 8 | 9 | 10 | 11 | 12 | 13 | 14 |
| PE | — | — | — | — | — | — | — |
| PA6 | — | — | — | — | — | — | — |
| PBT | 87 | 75 | 80 | 80 | 80 | 80 | 80 |
| POM | — | — | — | — | — | — | — |
| VE | — | — | — | — | — | — | — |
| EP | — | — | — | — | — | — | — |
| Si - A | — | — | — | — | — | — | — |
| Si - B | — | — | — | — | — | — | — |
| Si - C | — | — | — | — | — | — | — |
| Si - D | — | — | — | — | — | — | — |
| Si - E | — | — | — | — | — | — | — |
| Si - F | 3 | 5 | — | — | — | — | — |
| Si - G | — | — | — | — | — | — | — |
| Activated charcoal | — | — | — | — | — | — | — |
| Silicone oil | 10 | 20 | — | — | — | — | — |
| Ester oil | — | — | 20 | 10 | 10 | 10 | 10 |
| PTFE | — | — | — | 10 | — | — | — |
| Graphite | — | — | — | — | 10 | — | — |
| Calcium carbonate | — | — | — | — | — | 10 | — |
| Glass fiber | — | — | — | — | — | — | 10 |
| PET woven cloth | — | — | — | — | — | — | — |

TABLE 3

| Example | Specific wear amount *1 | Coefficient of dynamic friction | State of mating material *2 | Moldability *3 | Bending strength *4 |
|---|---|---|---|---|---|
| 1 | 180 | 0.075 | ○ | ○ | — |
| 2 | 180 | 0.12 | ○ | ○ | — |
| 3 | 190 | 0.14 | ○ | ○ | — |
| 4 | 190 | 0.14 | ○ | ○ | — |
| 5 | 180 | 0.12 | ○ | ○ | — |
| 6 | 170 | 0.115 | ○ | ○ | — |
| 7 | 160 | 0.13 | ○ | ○ | — |
| 8 | 170 | 0.12 | ○ | ○ | — |
| 9 | 140 | 0.05 | ○ | ○ | — |
| 10 | 150 | 0.055 | ○ | ○ | — |
| 11 | 160 | 0.06 | ○ | ○ | — |
| 12 | 140 | 0.05 | ○ | ○ | — |
| 13 | 200 | 0.085 | ○ | ○ | — |
| 14 | 150 | 0.13 | ○ | ○ | 72 |
| 15 | 140 | 0.14 | ○ | ○ | 70 |
| 16 | 150 | 0.14 | ○ | ○ | 71 |
| 17 | 140 | 0.13 | ○ | ○ | 160 |
| 18 | 80 | 0.10 | ○ | — | — |
| 19 | 180 | 0.09 | ○ | — | — |
| 20 | 150 | 0.05 | ○ | ○ | — |

*1 unit of specific wear amount, $\times 10^{-8}$ mm$^3$/(N · m)
*2 state of mating material ○: not damaged, X: damaged
*3 moldability ○: easy to mold, Δ: some problems, X: unmoldable
*4 unit, Mpa

TABLE 4

| Example | Specific wear amount *1 | Coefficient of dynamic friction | State of mating material *2 | Moldability* 3 | Bending strength *4 |
|---|---|---|---|---|---|
| 1 | 950 | 0.12 | ○ | ○ | — |
| 2 | 800 | 0.28 | ○ | ○ | — |
| 3 | 9000 | 0.28 | ○ | ○ | 82 |
| 4 | 2800 | 0.29 | ○ | ○ | — |
| 5 | 600 | 0.21 | ○ | Δ | — |
| 6 | 700 | 0.26 | ○ | ○ | — |
| 7 | 600 | 0.22 | ○ | Δ | — |
| 8 | 500 | 0.2 | ○ | Δ | — |
| 9 | — | — | — | X | — |
| 10 | — | — | — | X | — |
| 11 | 400 | 0.21 | ○ | Δ | 45 |
| 12 | 450 | 0.21 | ○ | Δ | 50 |
| 13 | 450 | 0.2 | ○ | Δ | 52 |
| 14 | 500 | 0.21 | X | Δ | 120 |

*1 unit of specific wear amount, $\times 10^{-8}$ mm$^3$/(N · m)
*2 state of mating material ○: not damaged, X: damaged
*3 moldability ○: easy to mold, Δ: some problems, X: unmoldable
*4 unit, Mpa

TABLE 5

| Ingredient | Abbr. | Maker: article |
|---|---|---|
| Polyethylene resin | PE | Mitsui Chemicals Incorp.: CM1001 |
| Polyamide-6-resin | PA6 | Toray Corp.: CM1001 |
| Polybutylene terephthalate | PBT | Polyplastics Corp.: Duranex20 |
| Polyacetal resin | POM | Polyplastics Corp.: DuraconM90 |
| Vinyl ester resin | VE | Mitsui Chemicals Incorp.: Ester-H-8100 |
| Epoxy resin | EP | Three Bond Corp.: epoxy resin 2057 |
| Porous silica-A | Si-A | Asahi Glass Corp.: Sun Sphere H32 |
| Porous silica-B | Si-B | Asahi Glass Corp.: Sun Sphere H52 |
| Porous silica-C | Si-C | Asahi Glass Corp.: Sun Sphere H122 |
| Porous silica-D | Si-D | Asahi Glass Corp.: Sun Sphere H53 |
| Porous silica-E | Si-E | Asahi Glass Corp.: Sun Sphere L31 |
| Porous silica-F | Si-F | Asahi Glass Corp.: Sun Sphere NP30 |
| Porous silica-G | Si-G | Tokai Kageku Kogyo Corp. Microid384 |
| Activated charcoal | — | Kureha Kagaku Kogyo Corp.: BAC |

TABLE 5-continued

| Silicone oil *1 | — | Shinetsu Sulicone Corp.: KF96H |
| Ester oil | — | Nippon Yushi Corp.: H481R |
| Polytetrafluoroethylene | PTFE | Kitamura Corp.: KTL610 |
| Graphite | — | LONZA Corp.: KS-6 |
| Calcium carbonate | — | Wako Junyaku Kogyo Corp. reagent |
| Glass fiber | — | Asahi Fiber Glass Corp.: CS03MA497 |
| Polyethylene terephthalate woven cloth | PET woven cloth | Polyethylene terephthalate plain woven cloth |

| Ingredient | Abbr. | Average particle diameter μm | Specific surface area m²/g | Oil absorption capacity mL/100 g |
|---|---|---|---|---|
| Polyethylene resin | PE | — | — | — |
| Polyamide-6-resin | PA6 | — | — | — |
| Polybutylene terephthalate | PBT | — | — | — |
| Polyacetal resin | POM | — | — | — |
| Vinyl ester resin | VE | — | — | — |
| Epoxy resin | EP | — | — | — |
| Porous silica-A | Si-A | 3 | 700 | 300 |
| Porous silica-B | Si-B | 5 | 700 | 300 |
| Porous silica-C | Si-C | 12 | 700 | 300 |
| Porous silica-D | Si-D | 5 | 700 | 400 |
| Porous silica-E | Si-E | 3 | 300 | 150 |
| Porous silica-F | Si-F | 3 | 40 | 30 |
| Porous silica-G | Si-G | 2 | 300 | 300 |
| Activated charcoal | — | — | 1000 | — |
| Silicone oil *1 | — | — | — | — |
| Ester oil | — | — | — | — |
| Polytetrafluoroethylene | PTFE | — | — | — |
| Graphite | — | — | — | — |
| Calcium carbonate | — | — | — | — |
| Glass fiber | — | — | — | — |
| Polyethylene terephthalate woven cloth | PET woven cloth | — | — | — |

*1: kinematic viscosity 6000 cSt(6000 mm²/s) at 25° C.

As shown in table 3, the molded material of the examples 1–18, 20 and the coating film of the example 19 all obtained from the resinous composition containing the porous silica impregnated with the lubricating oil had a specific wear amount not more than $200 \times 10^{-8}$ mm³/(N·m), which means that they were excellent in the wear resistance. They had a dynamic coefficient of friction in the range of 0.05–0.14 which were lower than those of the comparison examples. Table 3 also indicates that the mating material was not damaged. The moldability of the specimen of the examples 1–18 and 20 was favorable.

As shown in table 4, the dynamic coefficient of friction of the polyethylene resin (PE) of the comparison example 1 was 0.12 which was low, whereas that of the polyamide-6-resin (PA6), the polybutylene terephthalate (PBT), and the polyacetal resin (POM) of the comparison examples 2 and 3 was high, namely, in the range of 0.2–0.29. The specific wear amount of each resin was $(800–9,000) \times 10^{-8}$ mm³/(N·m) which was larger than that of the examples.

Because the specimen of the comparison examples 5–8 contained oil, the dynamic coefficient of friction thereof was comparatively low but a little higher than that of the specimen of the examples containing the porous silica. The specific wear amount of the specimen of the comparison examples 5–8 was $(500–70) \times 10^{-8}$ mm³/(N·m) which was higher than that of the specimen of the examples. In the specimen of the comparison examples 5, 7, and 8, during the injection molding, the screw had unfavorable sliding and the oil attached to the die. Thus the moldability was unfavorable. In the specimen of the comparison example 6, the activated charcoal having a large specific area was impregnated with the lubricating oil. The specimen kept the oil therein without supplying the oil to the slide interface and had a high dynamic coefficient of friction.

Because the specimen of the comparison examples 9 and 10 contained the oil at 20 vol % which was comparatively large, the screw slipped. Thus a specimen could not be prepared.

Because the specimen of the comparison examples 11 through 14 contained the oil and the filler, it had a com-

TABLE 6

| | Example | | | | Comparison Example | | | | | | | |
|---|---|---|---|---|---|---|---|---|---|---|---|---|
| | 21 | 22 | 23 | 24 | 15 | 16 | 17 | 18 | 19 | 20 | 21 | 22 |
| Ingredient (vol %) | | | | | | | | | | | | |
| PE | 75 | — | — | — | 80 | — | — | 95 | — | — | 90 | 90 |
| PA6 | — | 75 | — | — | — | 80 | — | — | 95 | — | — | — |
| POM | — | — | 75 | — | — | — | 80 | — | — | 95 | — | — |
| EP | — | — | — | 75 | — | — | — | — | — | — | — | — |
| Additive imparting Lubricity | 25 | 25 | 25 | 25 | — | — | — | — | — | — | — | — |
| Si - B | — | — | — | — | — | — | — | 5 | 5 | 5 | — | — |
| Silicone oil | — | — | — | — | 20 | 20 | 20 | — | — | — | — | — |
| PTFE | — | — | — | — | — | — | — | — | — | — | 10 | — |
| Graphite | — | — | — | — | — | — | — | — | — | — | — | 10 |
| Characteristic | | | | | | | | | | | | |
| Specific wear amount *1 | 180 | 180 | 190 | 190 | — | — | — | 2500 | 3000 | 4000 | 700 | 800 |
| Coefficient of dynamic friction | 0.08 | 0.12 | 0.13 | 0.13 | — | — | — | 0.25 | 0.26 | 0.24 | 0.18 | 0.18 |
| State of mating material *2 | ○ | ○ | ○ | ○ | — | — | — | X | X | X | ○ | ○ |
| Moldability *3 | ○ | ○ | ○ | ○ | — | — | — | ○ | ○ | ○ | ○ | ○ |

*1 unit of specific wear amount, $\times 10^{-8}$ mm³/(N · m)
*2 state of mating material ○: not damaged, X: damaged
*3 moldability ○: easy to mold, Δ: some problems, X: unmoldable paratively low dynamic coefficient of friction. However, specific wear amount both of which were higher than those of the specimen of the examples containing the spherical porous silica. During the injection molding, the screw had unfavorable sliding and the oil attached to the die. Thus the moldability was a little unfavorable. The specimen of the comparison examples 11 through 14 had a much lower bending strength than the specimen of the examples 14–17. This is because the oil present in the specimen of the examples 14–17 was contained in the porous silica, and oil was not present between the filler and the base resin. Thus the specimen of the examples 14–17 had superior reinforcing effect. On the other hand, in the specimen of the comparison examples 11–14, oil was present between the filler and the base resin. Thus the specimen of the comparison examples 11 through 14 had insufficient reinforcing effect.

As shown in table 6, the molded material of the examples 21–23 containing the additive and the coating film of the example 24 had a low specific wear amount and dynamic coefficient of friction. That is, the additive of the present invention functions as an additive capable of imparting lubricity to the composition having lubricity.

On the other hand, the pin of the comparison examples 15–17 could not be formed. Because the pin of the comparison examples 18 through 20 did not contain the additive, the pin was not provided with lubricity and was thus inferior in the sliding performance.

As described above, because the composition contains the base material, the porous silica, and the lubricant, the lubricant is held inside the porous silica and supplied to the slide interface little by little. Consequently the composition can maintain good abrasive and wear characteristics.

Further, because the porous silica is impregnated with the lubricant, the composition can maintain mechanical property, and a large amount of the oil component can be contained in the resinous composition.

Another composition of the present invention contains the lubricant-impregnated porous silica in the base material. Owing to compatibility between the lubricating oil and the resin as well as the elastomer, it is possible to accomplish kneading of combinations of materials which has not been hitherto made. Further because the lubricant can be contained in the base material, a large amount of the lubricant can be used for the resinous composition. Further it does not occur that a screw slip in a kneading time, metering is unstable, which causes a cycle time to be long, a size accuracy is unstable, and the lubricant attaches to the surface of a die, which causes the finish of a molded product to be poor.

Because the spherical porous silica for use in the slide-material composition is a true spherical porous silica having the interconnected pores, the spherical porous silica is destroyed by the shearing force of the slide interface. Consequently it does not injure even a soft slide mating material.

The average particle diameter of the spherical porous silica is 0.5–100 µm. Accordingly, the spherical porous silica is superior in its dispersing property into resinous composition. Thus when the spherical porous silica is used in combination with a reinforcing material, it is possible to prevent the lubricant from being present on the interface between the reinforcing material and the resin. Thus predetermined reinforcing effect can be obtained.

Because the additive of the present invention contains the lubricant-impregnated porous silica, it is useful for imparting lubricity to the resinous material, the material having rubber elasticity, and the material that can be formed as the coating film.

EXAMPLES 25–30 AND COMPARISON EXAMPLES 23–26

The examples 25–30 relate to the retainer for the rolling bearing.

As heat-resistant and oil-resistant resin, polyamide resin [Amilan CM1001 (6-nylon), tradename, produced by Toray Corp.] was used. As the lubricating oil, ester oil (Unistar H481R, trade name, produced by Nippon Yushi Corp.) was used. In addition, spherical silica particle (Sunsphere H52, trade name, produced by Asahi Glass Corp., average diameter: 5 µm, oil absorption capacity: 300 ml/100 g) and a fibrous oil-guiding material (glass fiber CS03MA497, trade name, produced by Asahi Fiber Glass Corp., diameter of fiber: 13 µm, length of fiber: 3 mm) were used. The components were mixed with one another at the mixing ratio shown in table 7. After the spherical silica particle was impregnated with the lubricating oil, the mixture containing the lubricating oil and the polyamide resin were introduced into the Henschel mixer and mixed with each other. Thereafter, the mixture was melted and kneaded by using a biaxial extruder (manufactured by Plastic Engineering Laboratory: BT30) to prepare a pellet. The pellet was injection-molded at 240° C. to prepare a retainer for a rolling bearing (equivalent to 684 type: dimension ø6.87 mm×ø5.30 mm×1.90 mm) having a predetermined configuration.

As one of comparison materials to be tested, a grease-filled article (2 mg of grease, Maltemp SRL, trade name, produced by Kyodo Yushi Corp.) was prepared.

The retainers was incorporated in a test bearing consisting of a miniature ball bearing (inner ring, outer ring, and rolling element are made by bearing steel) whose inner diameter was 4 mm, outer diameter was 9 mm, and width was 4 mm to measure the variability percentage (jitter) of rotational speed, the torque, actuation sound, and durable time period by the following method as the performance of the bearing. The result is shown in table 7.

A specimen, having a diameter of ø100 mm and a thickness of 2 mm, formed from components mixed at the ratio shown in table 7 was compression-molded at a temperature of 240° C. By using the molded product, the ooze amount (weight reduction percentage) of the lubricating oil was measured. The result is shown in table 7.

EXAMPLE 31

A retainer for a rolling bearing was prepared by the method similar to that of the example 30 except that the polyamide resin was replaced with polyacetal resin (Duracon M90, trade name, produced by Polyplastics Corp.); the extrusion temperature at the time when the pellet was extruded by the biaxial extruder was altered to 190° C.; and the injection molding temperature was altered to 195° C.

(1) Measurement of Variability Percentage (Jitter) of Rotational Speed

The rotational speed was measured with an FG jitter measuring apparatus. The measuring condition was that under the condition of a rotational speed was 15,000 rpm, after 10-minute aging, 30-second jitter measurement was conducted five times to find the average (variability percentage of rotational speed, %).

(2) Measurement of Torque

Torque (gf-cm) was measured under the condition of the number of rotations was 15,000 rpm and an axial load was 1 kgf.

(3) Actuation Sound

An acoustic sound (dBA) after 100-hour rotation was measured under the condition of a rotational speed of 10,000 rpm and an axial load 0.5 kgf.

(4) Durability Test

Under the condition of an axial load of 1 kgf and a rotational speed of 10,000 rpm, the time period required for the bearing to rotate at a vibration acceleration within three-fold of an initial speed was examined. In that case, the target hour was 3000. When the vibration value of the bearing exceeded the predetermined condition, the test was stopped.

(5) Ooze Amount of Lubricating Oil (Weight Reduction Percentage of Molded Material)

The weight of a molded material was measured. The molded material was covered with paraffin paper to facilitate oozing of the lubricating oil. The molded material was held in a constant-temperature bath at 80° C. for six hours, with a weight of 500 g placed thereon to measure the weight of the molded product. The weight of the molded product after six hours was subtracted from the initial weight thereof air to compute a reduced weight. The reduced weight was divided by the initial weight to determined a weight reduction percentage. The weight reduction percentage=(reduced weight/initial weight)×100. The reduced weight is considered as the oozed amount of the lubricating oil. Thus it can be said that the more the weight reduction percentage is, the more the oozed amount of the lubricating oil is.

(6) Moldability

Moldabilities at the time of the injection molding were compared with one another. The example in which the components could be molded without problem was marked as ○; the example in which the screw had unfavorable sliding, oil attached to the die, and measurement took much time was marked as Δ. The example in which the pellet could not be molded was marked as x.

26 containing the polyamide resin, the porous silica, and the lubricating oil, that of the examples 27–30 containing the fibrous oil-guiding material, and that of the example 31 containing the polyacetal resin. The acoustic sound was also low in the range of 30–32 dBA.

They were operated not less than 3000 hours. Thus they were fine in the durability. It is understood that the lubricating oil was supplied stably to the surface of the retainer through the porous silica or the glass fiber. In each example, the weight reduction percentage was in the range of 1.1–1.6. Thus it can be said that the ooze amount of the oil was large. Because the pellet contained a large amount of the lubricating oil, the moldability of each example was all ○.

On the other hand, the retainer of the comparison example 23 did not contain the porous silica. Thus the lubricating oil present inside the molded resinous material did not ooze to the portion of contact between the molded product and the rolling element. As a result, the molded product of the comparison example 23 had a larger value than that of the examples in the variability percentage of rotational speed, the torque, and the acoustic sound. Because the lubricating oil did not ooze out from the retainer, vibration became larger little by little as the lubricating oil on the surface portion decreased. Thus the durability was poor. The weight reduction percentage was as low as 0.1, which indicates the ooze amount of the oil was small. Because the pellet contained a comparatively large amount of the lubricating oil, the moldability of the comparison example 23 was Δ.

The retainer of the comparison example 24 did not contain the lubricating oil, and the slide portion was lubricated by sealing grease therein. Thus the grease was scattered when it was operated and attached to the ball-rolling surface. Consequently, the variability if percentage of rotational speed was high and the resistance to stirring of the grease was high. Thus the torque was about 10 times as large as that of each example.

TABLE 7

| | Example | | | | | | | Comparison Example | | | |
|---|---|---|---|---|---|---|---|---|---|---|---|
| | 25 | 26 | 27 | 28 | 29 | 30 | 31 | 23 | 24 | 25 | 26 |
| Ingredient (vol %) | | | | | | | | | | | |
| Polyamide resin | 84 | 70 | 55 | 48 | 42 | 59 | — | 88 | 95 | 77 | 40 |
| Polyacetal resin | — | — | — | — | — | — | 53 | — | — | — | — |
| Porous silica particle | 3 | 5 | 12 | 19 | 7 | 3 | 4 | — | — | — | 43 |
| Lubricant | 13 | 25 | 28 | 28 | 45 | 22 | 25 | 12 | — | 23 | 17 |
| fibrous oil-guiding material | — | — | 5 | 5 | 6 | 16 | 18 | — | 5 | — | — |
| Remarks | — | — | — | — | — | — | — | — | Grease sealed | — | — |
| Test results | | | | | | | | | | | |
| variability percentage of rotational speed (%) | 0.013 | 0.012 | 0.011 | 0.011 | 0.010 | 0.010 | 0.010 | 0.081 | 0.051 | — | — |
| Torque (gf·cm) | 0.4–0.6 | 0.4–0.5 | 0.4–0.6 | 0.4–0.5 | 0.4–0.5 | 0.4–0.5 | 0.4–0.5 | 7–8 | 5–6 | — | — |
| Actuation sound, acoustic sound (dBA) | 31 | 30 | 32 | 31 | 30 | 31 | 31 | 40 | 40 | — | — |
| Durability test (time) | Not less than 3000 | Not less than 3000 | Not less than 3000 | Not less than 3000 | Not less than 3000 | Not less than 3000 | Not less than 3000 | 150 | Not less than 3000 | — | — |
| Weight reduction percentage (%) | 1.1 | 1.2 | 1.4 | 1.4 | 1.6 | 1.4 | 1.4 | 0.1 | — | — | — |
| Moldability | ○ | ○ | ○ | ○ | ○ | ○ | ○ | Δ | ○ | X | X |

As shown in table 7, the variability percentage of rotational speed was stably low in the range of 0.010–0.013, and the torque was low in the range of 0.4–0.6 g·cm in the retainer-incorporated rolling bearing of the examples 25 and In the case of comparison example 25, the pellet did not contain the porous silica and the addition amount of the lubricating oil was as large as 23 vol %. Therefore, in the injection molding, the screw slipped and the pellet was not stably supplied to the molding machine and could not be molded into the configuration of the retainer.

In the case of comparison example 26, the pellet contained as much as 43 vol % of the porous silica. Thus the molded material was frail and could not be molded into the configuration of the retainer.

The rolling bearing of each example incorporated the retainer superior in its lubricating oil supply performance. Thus the rolling bearing can be used in a preferable lubricity for a long time without using grease and is not liable to seize.

Furthermore grease was not sealed in the slide portion. Thus the rise of torque depending on stirring of the grease can be suppressed.

In the conventional grease-sealed bearing, when drive condition is strict (high speed, high temperature, high load, and the like), the lubricating oil is not supplied sufficiently from the grease. In this case, the bearing may seize owing to faulty lubrication. On the other hand, the rolling bearing incorporating the retainer composed of the resinous composition in which the porous silica is impregnated with the lubricating oil has an advantage that faulty lubrication is not liable to occur because the lubricating oil is supplied from the inside. It is possible to use the grease for the retainer for the rolling bearing of the present invention to use it for a long time.

The retainer for the rolling bearing is composed of the molded material of the synthetic resinous composition containing the synthetic resin, the porous silica, and the lubricant. Thus the lubricant is held in the porous silica. Consequently, the lubricant oozes to the surface of the retainer. Thereby the rolling bearing has a low torque and a low degree of torque fluctuation. Thus the rolling bearing operates stably for a long time and has little dust and noise generation. In addition, the rolling bearing has favorable mechanical characteristic and is durable.

In particular, the porous silica is impregnated with the lubricant. Further the porous silica has interconnected pores and spherical. Therefore, the lubricant held by the porous silica oozes to the surface of the retainer easily.

Furthermore the average particle diameter of the spherical porous silica is 0.5–100 μm. Accordingly, the rolling bearing has a low torque and a low degree of torque fluctuation. Thus the rolling bearing operates stably for a long time and has little dust and noise generation. In addition, the rolling bearing has favorable mechanical characteristic and is durable.

The synthetic resinous composition composing the retainer for the rolling bearing contains 40–90 vol % of the synthetic resin, 1–50 vol % of the lubricant, and 1–30 vol % of the porous silica. In addition the fibrous oil-guiding material is mixed with the synthetic resin, the lubricant, and the porous silica, and a mixture of these substances is molded. Thus it is possible to increase the mixing amount of the lubricant. Consequently, in addition to the above effect, the moldability of an oil-containing material, which is difficult to mold a conventional oil-containing material, can be improved.

EXAMPLES 32–36 AND

COMPARISON EXAMPLES 27–30

The examples 32–36 relate to the seismically isolated apparatus.

The materials used in each example and each comparison example are shown below. Table 8 shows the mixing ratio among the components. The mixing ratio among the components is indicated by vol % and description in ( ) below is the same as the abbreviation in table 8.

(1) Vinyl Ester Resin (VE)
  Produced by Mitsui Chemicals Incorp.: Ester H8100
(2) Ultra-high-molecular-weight Polyethylene (PE)
  Produced by Mitsui Chemicals Incorp.: Mipelon XM220
(3) Modified PTFE (Modified PTFE)
  Produced by Mitsui•Dupont Florochemical Corp.: Teflon7J
(4) PTFE Woven Cloth (PTFE Woven Cloth)
  PTFE woven cloth, plain weave, warp (denier): 800/80, weft (denier): 800/80, density (warp×weft, number of threads/inch) 40×40
(5) Porous Silica (Porous Silica)
  Produced by Asahi Glass corp.: Sunsphere H52 (particle diameter: 5 μm, oil absorption capacity: 300 ml/100 g)
(6) Silicone Oil (Silicone Oil)
  Produced by Shinetsu Silicone Corp.: KF96H-6000 (kinematic viscosity at 25° C.: 6000 cSt)
(7) Fluorine Oil (Fluorine Oil)
  Produced by Dupont Corp.: Crytox GPL207 (kinematic viscosity at 20° C.: 1600 cSt)
(8) PTFE Composite Material Containing 20 vol % of Glass Fiber (PTFE Composite Material)
  20 vol % of glass fiber was added to PTFE (Teflon 7J produced by Mitsui•Dupont Florochemical Corp.) to be compression-molded. After the mixture was compression-molded at a surface pressure of 45 Mpa, the molded material was calcined at 370° C.

EXAMPLES 32–34

The porous silica and oil were mixed with each other at the ratio shown in table 8 with a mixer in advance. The mixture was added to vinyl ester resin at the ratio shown in table 8. After the mixture was mixed sufficiently with the mixer, the PTFE woven cloth was impregnated with the mixture by hand lay-up method. A hardened laminated plate was machined to prepare a plate-shaped specimen having a dimension of (30×30×3) mm. The plate-shaped specimen was bonded to a block of S45C having a dimension of (30×30×30) mm with epoxy resin to prepare a slide member specimen for friction/wear test.

EXAMPLES 35 AND

COMPARISON EXAMPLES 27–29

The porous silica and oil were mixed with each other at the ratio shown in table 8 with a mixer in advance. Heating compression molding was performed for the mixture and polyethylene resin. The molded product was machined to prepare a plate-shaped specimen having a dimension of (30×30×3) mm. The plate-shaped specimen was bonded to a block of S45C having a dimension of (30×30×10) mm with epoxy resin to prepare a slide member specimen for friction/wear test. In the example 35, a cross concavity (FIG. 9) having a width of 1 mm and a depth 1 mm was formed on a slide surface.

EXAMPLE 36

Materials except silicone oil were mixed with each other at the ratio shown in table 8 with a mixer. Heating compression molding was performed for the mixture. The molded product was machined to prepare a plate-shaped specimen having a dimension of (30×30×3) mm. The plate-shaped specimen was impregnated with a predetermined amount of the silicone oil in vacuum. As a result, the plate-shaped specimen was impregnated with the silicone oil corresponding to 40 vol % of the whole volume. The plate-shaped specimen was bonded to a block of S45C having a dimension of (30×30×10) mm with epoxy resin to prepare a slide member specimen for friction/wear test.

The obtained slide member specimen for friction/wear test was combined with a buffed stainless steel plate (SUS304) to evaluate the slide characteristic.

A reciprocating testing machine (stroke±35 mm) was reciprocated, with the specimen for friction/wear test being pressed against the stainless steel plate to measure the coefficient of friction and the specific wear amount. As the test conditions, the surface pressure was fixed to 17.6 Mpa and the slide speed was increased stepwise in the order of 3, 50, 250, and 430 mm/s. The coefficient of friction was measured at each speed. The number of slides was 40 cycles at each speed. The specific wear amount was computed from the difference between the weight before the test started and the weight after all tests terminated. The coefficient of friction and the specific wear amount are shown in table 8.

TABLE 8

|  | Example | | | | | Comparison Example | | | |
| --- | --- | --- | --- | --- | --- | --- | --- | --- | --- |
|  | 32 | 33 | 34 | 35 | 36 | 27 | 28 | 29 | 30 |
| Ingredient (vol %) | | | | | | | | | |
| VE | 56 | 50.6 | 50.6 | — | — | — | — | — | — |
| PE | — | — | — | 64 | — | 96.5 | 35 | — | — |
| Modified PTFE | — | — | — | — | 55 | — | — | 39 | — |
| PTFE woven cloth | 35 | 35 | 35 | — | — | — | — | — | — |
| Porous silica | 1.5 | 2.4 | 2.4 | 6 | 25 | 0.5 | 35 | 6 | — |
| Silicone oil | 7.5 | 12 | — | 30 | 20 | 3 | 30 | 55 | — |
| Fluorine oil | — | — | 12 | — | — | — | — | — | — |
| PTFE composite material | — | — | — | — | — | — | — | — | 100 |
| Test results | | | | | | | | | |
| Coefficient of friction | | | | | | | | | |
| Speed, 3 mm/s | 0.09 | 0.08 | 0.07 | 0.07 | 0.09 | 0.13 | 0.12 | 0.07 | 0.09 |
| Speed, 50 mm/s | 0.09 | 0.07 | 0.07 | 0.07 | 0.08 | 0.13 | 0.12 | 0.07 | 0.11 |
| Speed, 250 mm/s | 0.09 | 0.07 | 0.06 | 0.06 | 0.08 | 0.12 | 0.12 | 0.06 | 0.13 |
| Speed, 430 mm/s | 0.1 | 0.07 | 0.06 | 0.08 | 0.09 | 0.14 | 0.13 | 0.08 | 0.15 |
| Specific wear amount, ×$10^{-8}$ mm$^3$/(N · m) | 500 | 300 | 200 | 300 | 800 | 1000 | 4000 | 5000 | 3000 |

As shown in table 8, in the example 27, the mixing amount of the porous silica and the lubricant are smaller than the predetermined amount. Thus the coefficient of friction is high. In the comparison example 28 and 29, the mixing amount of the porous silica and the lubricant are larger than the predetermined amount. Thus the coefficient of friction or the specific wear amount was high. Because the PTFE composite material contained the glass fiber, it damages the mating material. As a result, abraded powder generated from the mating material is present on the slide interface. Owing to an abrasive state, the coefficient of friction and the specific wear amount were high.

On the other hand, both the coefficient of friction and the specific wear amount of the specimen of each example were low and had little dependency on speed. That is, the specimen displayed excellent characteristic as the slide material for the seismically isolated apparatus.

In the seismically isolated apparatus, at least one of slide surfaces of slide support generating a slide when the seismically isolated apparatus operates includes a resinous composition containing the porous silica and the lubricant essentially. Thus the seismically isolated apparatus reliably shows a low degree of friction and wear at a high surface pressure and a high speed. Consequently the seismically isolated apparatus can absorb a strong shock of a seism effectively when it is mounted even on a large building.

The porous silica is impregnated with the lubricant. In particular, the porous silica has interconnected pores and is spherical. The average diameter of particles of the porous silica is 1–100 μm. Therefore, the seismically isolated apparatus has mechanical characteristic of maintaining a small compression deformation amount even at a high surface pressure and can maintain a low degree of friction and wear. Consequently the seismically isolated apparatus has improved resistance to load.

What is claimed is:

1. A composition having lubricity comprising:
   a base material;
   a porous silica; and
   a lubricant.

2. A composition having lubricity according to claim 1, wherein said porous silica is impregnated with the lubricant.

3. A composition having lubricity according to claim 1, wherein said porous silica comprises a spherical porous silica having an interconnected pores.

4. A composition having lubricity according to claim 3, wherein said spherical porous silica is a true spherical silica particle which comprises an aggregation of primary silica particles whose average diameter is 3–8 nm.

5. A composition having lubricity according to claim 4, wherein an average diameter of said true spherical silica particle is 0.5–100 μm.

6. A composition having lubricity according to claim 3, wherein said spherical porous silica is a precipitated silica particle which is an aggregation of primary particles whose diameters are not less than 15 nm.

7. A composition having lubricity according to claim 1, wherein said base material is synthetic resin.

8. A composition having lubricity according to claim 1, wherein said base material is a material having rubber elasticity.

9. A composition having lubricity according to claim 1, wherein said base material is a material which is a film former.

10. A composition having lubricity according to claim 1, wherein said lubricant is at least one lubricating substance selected from the group consisting essentially of lubricating oil, wax, and a greasy substance.

11. A composition having lubricity according to claim 1, wherein said porous silica is contained at 1–20 vol %, said lubricant is contained at 5–40 vol %, and said base material is contained at a remaining vol %.

12. An additive imparting lubricity to a base material, comprising:

a porous silica; and a lubricant to be impregnated into the porous silica.

13. An additive imparting lubricity to a base material according to claim 12, wherein an amount of said lubricant impregnating said porous silica is not less than 40 vol % of said porous silica.

14. A product having a slide portion, comprising said slide portion is formed of the composition according to claim 1.

15. A product having a slide portion according to claim 14, wherein said product is a slide bearing.

16. A product having a slide portion according to claim 14, wherein said product is a retainer for a holding a rolling element of a rolling bearing.

17. A product according to claim 16, wherein said composition having lubricity contains a fibrous oil-guiding material.

18. A product according to claim 16, wherein said lubricant is contained at 1–50 vol %.

19. A product according to claim 16, wherein said porous silica is contained at 1–30 vol %.

20. A product according to claim 14, wherein said product is a seismically isolated apparatus having a slide support disposed between a lower body thereof and an upper body thereof; and at least one of slide surfaces of said slide support generating a slide when said seismically isolated apparatus reduces a seism force is formed of said composition having lubricity according to claim 1.

* * * * *